United States Patent
Bolle et al.

(10) Patent No.: US 8,126,276 B2
(45) Date of Patent: Feb. 28, 2012

(54) BUSINESS METHOD FOR SELECTABLE SEMANTIC CODEC PAIRS FOR VERY LOW DATA-RATE VIDEO TRANSMISSION

(75) Inventors: Rudolf M. Bolle, Bedford Hills, NY (US); Jonathan Connell, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 2241 days.

(21) Appl. No.: 09/789,957

(22) Filed: Feb. 21, 2001

(65) Prior Publication Data
US 2002/0114525 A1  Aug. 22, 2002

(51) Int. Cl.
*G06K 9/36* (2006.01)
(52) U.S. Cl. .............. 382/232; 382/233; 375/E7.137; 375/E7.172; 375/E7.083; 375/E7.026
(58) Field of Classification Search .......... 705/1, 2, 705/7, 11, 13, 26, 27, 500; 725/9, 10, 12, 725/21, 105, 110; 340/539.18, 539.17, 539.16, 340/539.25, 539.22; 348/143, 169; 370/260; 382/232, 233; 375/E7.137, E7.132, E7.126, 375/E7.026, E7.152, E7.172, E7.083, E7.076
See application file for complete search history.

(56) References Cited

U.S. PATENT DOCUMENTS

| | | | | |
|---|---|---|---|---|
| 5,073,819 A * | 12/1991 | Gates et al. | .................... | 348/140 |
| 5,103,306 A * | 4/1992 | Weiman et al. | ............ | 348/400.1 |
| 5,528,656 A * | 6/1996 | Annis | ........................... | 378/98.2 |
| 5,581,297 A * | 12/1996 | Koz et al. | ...................... | 348/152 |
| 5,619,183 A * | 4/1997 | Ziegra et al. | .................. | 340/505 |
| 5,666,434 A * | 9/1997 | Nishikawa et al. | ........... | 382/128 |
| 5,689,442 A * | 11/1997 | Swanson et al. | .............. | 380/241 |
| 5,745,126 A * | 4/1998 | Jain et al. | ...................... | 382/154 |
| 5,805,221 A * | 9/1998 | Lee | ............................. | 375/240.1 |
| 5,828,413 A * | 10/1998 | Jayant et al. | ............. | 375/240.22 |
| 5,832,115 A | 11/1998 | Rosenberg | | |
| 5,844,601 A * | 12/1998 | McPheely et al. | ........... | 348/143 |
| 5,854,856 A * | 12/1998 | Moura et al. | .................. | 382/232 |
| 5,883,979 A * | 3/1999 | Beretta et al. | ................. | 382/251 |
| 5,926,209 A * | 7/1999 | Glatt | ............................ | 348/143 |
| 5,974,172 A | 10/1999 | Chen | | |
| 6,005,633 A * | 12/1999 | Kosugi | ......................... | 348/518 |
| 6,026,183 A | 2/2000 | Talluri et al. | | |
| 6,046,712 A * | 4/2000 | Beller et al. | ...................... | 345/8 |
| 6,249,324 B1 * | 6/2001 | Sato et al. | ..................... | 348/705 |
| 6,317,039 B1 * | 11/2001 | Thomason | .................... | 340/505 |
| 6,323,898 B1 * | 11/2001 | Koyanagi et al. | ............. | 348/169 |
| 6,342,915 B1 * | 1/2002 | Ozaki et al. | .................... | 340/505 |
| 6,456,321 B1 * | 9/2002 | Ito et al. | ........................ | 348/143 |

(Continued)

OTHER PUBLICATIONS

Digital Video: An Introduction to MPEG-2(B.G. Haskell, et al) pp. 1-13; pp. 370-382; pp. 387-388.

(Continued)

*Primary Examiner* — Igor Borissov

(57) ABSTRACT

A business method for using computer image processing for selectable task-based digital video compression is described. The method is intended to reduce travel of experts and let these experts direct field agents in performing tasks remotely. The tasks to be performed in the remote field can be monitoring, manipulating, and navigating. A field agent performs the manipulation and navigation operations, this agent can be a human being or a robot. The task-based compression algorithms use computer vision techniques to extract the bare minimum amount of information from the remote field scenery to allow the task to be performed. High frame rate photo-realistic reconstruction of the remote scene is not generally necessary.

32 Claims, 17 Drawing Sheets

U.S. PATENT DOCUMENTS

| | | | |
|---|---|---|---|
| 6,456,328 B1* | 9/2002 | Okada | 348/699 |
| 6,476,858 B1* | 11/2002 | Ramirez Diaz et al. | 348/159 |
| 6,522,352 B1* | 2/2003 | Strandwitz et al. | 348/211.2 |
| 6,970,183 B1* | 11/2005 | Monroe | 348/143 |
| 7,058,206 B1* | 6/2006 | Janssen et al. | 382/104 |
| 2002/0186668 A1* | 12/2002 | Thomason | 370/260 |
| 2003/0036974 A1* | 2/2003 | Allen | 705/27 |
| 2004/0252870 A1* | 12/2004 | Reeves et al. | 382/128 |

OTHER PUBLICATIONS

Computer Vision (D. Ballard, C.M. Brown) pp. 72-73; pp. 75-81; pp. 149-155, pp. 68-70.

Advanced Imaging—Jul. 1999, pp. 31-33.

* cited by examiner

BUSINESS METHOD FOR SELECTABLE SEMANTIC CODEC PAIRS FOR VERY LOW DATA-RATE VIDEO TRANSMISSION

FIELD OF THE INVENTION

The present invention generally relates to a business method using computer image processing, and, more particularly, to a computer image processing system for semantic video compression and decompression.

BACKGROUND OF THE INVENTION

Digital video is seldom transmitted or stored in its raw, original form. Rather, the digital video data is compressed in some fashion. Compression of video is possible because there are, depending on the type of footage, various amounts of redundancy present in the video signal. There exists spatial redundancy because, within the video frames, the signal does not change much between most pixels (picture elements of the video frame); there exists temporal redundancy because the video signal does not change much between most frames. There also exists perceptual redundancy because the pixel value fluctuations within frames and between frames contain more information than can be perceived by the human eye.

There are many video compression techniques, among which, such as the MPEG-1 and MPEG-2 standards, that try to exploit these redundancies in order to compress a video signal as much as possible while still maintaining the visual content of the video as well as possible. Spatial redundancy is exploited by transmitting the coefficients of the DCT transform of 8×8 image blocks. Temporal redundancy is exploited by transmitting only differences between subsequent frames, where these differences are expressed using motion compensation vectors. Perceptual redundancy is exploited by limiting the color information in the signal.

These compression standards support high resolution and high frame rate video. Lower-bandwidth video compression techniques (like H.263, H.320, and H.323) also exist, but these usually support only low resolution images (QSIF) at low frame rates (2 fps). Such compression schemes are usually designed either as general-purpose systems for any image type, or specifically as video conferencing systems.

A more recent compression standard, which is still under development, is MPEG-4. Where MPEG-1 and MPEG-2 do not take into consideration the visual content of the individual video frames, MPEG-4 does. Rather than basing the compression on image blocks, the compression is based on image regions that actually may correspond to semantically meaningful area of the 3D scene. For example, a textured region can be compressed as a representation of its boundary plus parameters that describe the texture, possibly with a residual image as well. Although MPEG4 does not prescribe how the regions are to be extracted, computer vision techniques are often used. MPEG-4 also has provisions for very high-level compression of moving faces. A general geometric face model is predefined with a number of control points. The encoder just has to set the initial location of these points and provide trajectories for them as the video progresses. It is up to the decoder then to take care of reconstructing and displaying a suitable face based on this parameter set.

A compressor and corresponding decompressor pair that can code a signal into a compressed form and then can decode a signal back into its original format is called a codec. The compression can either be lossless, in which case the decoded signal is equal to the original signal, or lossy, in which case the decoded signal is merely a "good" approximation of the original signal. In the latter case, information is lost between the original and reconstructed signal, but a good compression algirithm attempts to ensure the best possible decoded signal (usually from a human perceptual standpoint) within a given bit rate. Lossless techniques could also be applied to an image or video, but generally do not yield enough data reduction to be very useful (typically compression ratios between 1.2 and 2.5, whereas MPEG-1 usually runs at 30 to 50).

The following reference describes examples of the state of the prior art in compression technology:

B. G. Haskell, A. P. Puri, and A. N. Netravali,
Digital Video: An Introduction to MPEG-2, Chapman & Hall: New York, 1997

Chapter 1 pages 1-13, introduces compression, standards for video conferencing (H.320), MPEG1 and MPEG2. The low bit-rate standard, H.263, is handled on pages 370-382. MPEG4 is introduced on pages 387-388. These references are incorporated herein in their entirety.

The compression techniques proposed herein require computer vision techniques. The following computer vision techniques are especially relevant.

Edge detection: These are techniques to identify sharp discontinuities in the intensity profile of images. Edge detectors are operators that compute differences between pairs of neighboring pixels. High responses to these operators are the identified as edge pixels. Edge maps can be computed in a single scan through the image. Examples of edge detection are the Gradient- and Laplacian-type edge finders and edge templates such as Sobel.

Region finding: This is a class of techniques that identify areas of continuity within an image (in a sense, the opposite of edge detection). The areas that are to be detected are constant in some image property. This property can be intesity, color, texture, or some combination of these. Using connected components techniques, regions can be computed in a single scan. Clustering approaches have also been successfully. An example here is the detection of hands or faces in frames by finding regions with flesh tone.

Background subtraction: This is a method where two images are used to find image regions corresponding to objects. A first image is acquired without the objects present, then a second image with the objects. Subtracting the second image from the first and ignoring regions near zero results in a segmented image of the objects.

Normalized correlation: This is a technique for comparing two image patches Q1 and Q2. The normalized correlation at some translation T is defined as:

$$NC=[E(Q1Q2)-E(Q1)E(Q2)]/\text{Sigma}(Q1)\text{Sigma}(Q2)$$

with E(.) the expectation and Sigma(.) the variance. High values here indicate that the patches are very similar, despite possible differences in lighting conditions.

Normalized correlation and other computer vision techniques, are described more fully in:

D. Ballard and C. Brown, Computer Vision, Prentice-Hall: New Jersey, 1982.

Gradient- and Laplacian-type edge finders and edge templates can be found on pages 75-80; pages 149-155 describe region finding and connected components techniques; background subtraction on pages 72-73; and normalized correlation can be found on pages 68-70. These references are incorparted herein in their entirety.

Some of the above techniques are also used to process the frames in order to compute MPEG4 compression. However, MPEG4 (and MPEG1-2) coding techniques are, in general proprietary and hence descriptions of the actual techniques used are not available. Yet all that is important from a functional standpoint is that it is possible for decoders which adhere to the standard to decode the resulting signal.

Problems with the Prior Art

One of the concerns of this invention is the efficient use of professional's and expert's time, especially through savings on the time and money that is used for travel. Traditional means of dispersing experts to locations that can be remote is expensive and inefficient, mainly since it involves time-consuming expensive travel. Consider the following scenarios that are very costly in terms of personnel resources and travel.

A company is building a large hydroelectric dam. Sometimes life-threatening situations arise and an expert must be flown in. Typically, most work at the site stops until this individual arrives and diagnoses the problem.

High-priced service contracts for photocopiers guarantee that a technician will be on site within an hour, when needed. Such field service personnel often spend a large fraction of their time driving from site to site, not using their expertise. Other times, they sit around waiting for a call. These cases may mean idled manpower and machinery, schedule slippage, the need for a large staff and high travel costs.

There are prior art techniques that address these concerns. For example, the field of telemedicine is the practice of medicine at a distance, e.g., telepresence surgery. A military application of this is where highly qualified surgeons remotely assist battle field doctors and medics to perform delicate surgery on casualties with life threatening injuries. This work must be done in the field since the soldiers are often so injured that they cannot be easily moved. Civil applications of telemedicine, where the field doctors may be assisted by remotely controlled robot arms (by the expert surgeon), may eventually become widespread also. High quality, high-resolution cameras that record and transmit pertinent images needed for performing the medical task are of essence in telemedicine.

F. Hamit, "To the Virtual Collaborative Clinic: NASA and Telemedicine's Future,"

Advanced Imaging, July 1999, pp. 31-33.

This Reference is Incorporated in its Entirety

Many other types of tele-operations can be envisioned. For instance, in the civil engineering example mentioned above, an expert could remotely diagnose the problem and field personnel could then fix the problems under supervision of the expert. Similar solutions can be used in the copier repair arena. Lower paid field personnel could service and repair the copiers. When problems are difficult to diagnose or repair, the field agents could contact an expert in the office and establish a video link to let the expert direct and guide the field work.

A problem with these remotely diagnosis and repair processes is that video images of high resolution and high quality need to be transmitted. For digital video transmission this means that high bandwidth communications channels are required, even if compression is used. For analog video transmission this means that high power transmitters are required. Furthermore, hard-to-obtain licenses from the FCC need to be secured.

Compression techniques like the MPEG standards are designed to compress and decompress the video such that there is as little information loss as possible. That is, the decoded video is a faithful reconstruction of the original video, at least to the human eye. This is not always possible when there is a lot of motion in the video. For standard resolution, and in particular for HDTV, even such compressed signals are of too high a bandwidth. The bandwidth required is in the 1-20 Mbaud range depending on image resolution and quality. High bandwidth communication channels and high-bandwidth equipment are expensive, so low bandwidth is much more preferable. Also, in many remote areas such broadband links are not available. Instead there may only be a phone line (28-53 Kbaud) or cell-phone service (10-20 Kbaud).

However, while low-bandwidth codecs (like H.263) already exist, they usually support only low resolution images (QSIF) at low frame rates (2 fps or worse) over such channels. A number of tasks require better resolution. Other tasks require high update rate interaction between a field agent and the directing expert. Furthermore, these codecs are usually designed either as video conferencing products (where facial motion is paramount) or a general-purpose systems for any video type and genre. These prior art compression techniques used have no notion of what is important to a particular task and hence degrade all information uniformly. That is, prior art compression methods do not have a proper model of what information in the images in important to a given task and what is not. Hence, commonly available low bandwidth channels constrain standard video codecs to operate at too low speed to provide real-time feedback. This makes it impossible to direct some tasks remotely, an expert must be located in the field instead. In general, the problem with prior art compression is that it is not possible to transmit high-resolution, high frame rate over low bandwidth channels because these compression techniques are not designed for low bandwidth telepresence applications.

Much prior art in semantic or content-based compression concentrates on compression for video telephony and conferencing. This type of compression is highly geared to the fact that the video images contains a "talking head." An instance is the semantic compressor described in U.S. Pat. No. 5,832,115 to J. R. Rosenberg. This codec uses an edge detector to produce an edge map of each frame. A set of different size pattern templates having a pair of ellipsoid face-edge contours is defined off-line. These templates are correlated with the edge map and detect size and position of the face. Block-base compression (as in the MPEG1-2 standards) are then applied preferentially to the macro blocks (2×2 blocks) within the ellipse. Here, there is strong reliance on a two-dimensional model of talking head, although presumably other object models might also be used.

A content-based compression technique that is not dependent on object models is disclosed in U.S. Pat. No. 5,974,171 to T. Chen. Here the frames are segmented into subjected and non-subject regions. A simple way to do this is define a color spectrum for the desired subject region, and then declare any areas which do not have suitable pixel colors relative to this to be to non-subject regions. Just the subject regions are then coded and decoded. Video telephony is one application for this compression scheme.

U.S. Pat. No. 5,854,856 to Moura and Jasinschi describes a motion-based codec. First, moving figure velocity and background velocity are estimated. Second, the figure velocity is compensated with relation to the background velocity. Third, the figure is segmented using a threshold to detect if a figure moves in relation to the background. Fourth, the segmented figures are tessellated into blocks. A background image is computed using out and pasted operations. Compression is then achieved by transmitting the tessellated segmented figures and, only when border updates are needed, appropriate background images.

U.S. Pat. No. 6,026,183 to R. K. Talluri et. al describe a similar content-based compression scheme based on MPEG1-2. Regions of change (moving objects) are detected from reconstructed frame F(N−1) to the frame F(N). The boundaries of these regions, including holes, are encoded and added to the frame. Removal of temporal redundancies is achieved by finding blocks in the previous frame that match blocks in the current frame F(N). The signal is further compressed by synthesizing F(N)' from the previous frame and comparing F(N)' to F(N). This is done to find frame regions that still contain significant amounts of information (residual), which is then compressed in the same way. This helps support selective encoding/decoding of objects in the bitstream sequences as well as object scalability.

For all these prior art teachings, the objective is to reconstruct the video at the receiver-end as photo-realistic images with as much information as possible, at least in the frame areas of interest. That is, in important areas the decoded video should have all the properties of the original image (such as colors, edges, textures, motion, etc.) and also be visually pleasing. This is achieved by using motion detection or motion segmentation, region (sub/object) detection, or models of the expected objects in the video. None of the above systems describes selectable codes, in the sense that the receiver has the choice of different codecs to use.

U.S. Pat. No. 6,026,183 to R. K. Talluri et. al describe a codec that allows that operator to choose which objects in the video are to be encoded but, still, the goal is to make these objects look close to their original appearance when decoded. None of the codecs is geared to compressing the video in such a fashion that only that information that is pertinent to a given task is encoded. In addition, none of the codecs have the capability to transmit high-fidelity frames at the request of the viewer or according to given algorithmic rules. Further, prior art encoding depends heavily on fairly complex image processing and computer vision techniques. The breakdown of these techniques results in abrupt degradation of the decoded video signals. In general, it is preferable for the encoding, and hence the decoded signal, to instead degrade gratefully when the input video degrades in quality.

OBJECTS FOR THE INVENTION

It is therefore an object of the present invention to provide an improved business method for using task-based compression in tele-operations.

Another object of the invention is to allow the user to specify the type of task that is being performed and, based on this, automatically select an appropriate codec.

Another object of the invention is to provide a low bandwidth view finder mode to allow a remote operator to choose a specific scene to be encoded at a higher resolution.

A further object of the invention is to provide a low bandwidth the positioning mode to allow a remote operator to successfully point the camera or some other instrument at a specified object in the scene.

SUMMARY OF THE INVENTION

This invention describes a business method for using selectable task-based digital video codecs for very low bandwidth communication. Conventional video compression techniques have no notion of what is semantically important information in the video. The compression techniques described in this invention, on the other hand, are highly geared to the task for which the video is acquired an transmitted. Computer vision techniques are used to compute very compact representations of the video that can be transmitted at high frame rates over low bandwidth channels, even along with audio conversations on phone lines in some cases. Computer vision techniques such as edge detection, region finding, background subtraction, and normalized correlation are used to find semantically important image features. In such a way, a video representation that is meaningful within a given task domain computed.

In some preferred embodiments, the invention is intended to reduce travel of experts and let these experts guide and direct field agents in performing the operations in an office environment. The field here could be remote and dangerous locations such as space, deep sea exploration, ocean-going ships, hazardous areas, etc. The field agent could be a human being or a robot in the form of a robot arm or vehicle. The tasks to be performed in the remote field could be monitoring, manipulating, repairing, and navigating, among others.

BRIEF DESCRIPTION OF THE DRAWINGS

The foregoing and other objects, aspects and advantages will be better understood from the following detailed description of a preferred embodiments of the invention with reference to the drawings, in which.

DETAILED DESCRIPTION OF THE INVENTION

Recruiting highly qualified personnel with advanced skills can be costly and sometimes may not even be possible. On the other hand, providing highly advanced training to current employees can be time-consuming and expensive, especially if there is a high turn-over rate. Yet, there is often excess capacity hidden within an organization. That is, it may be possible to more effectively use the skills of the experts already present by cutting out low-value activities such as travel. In this way, a genuine savings can be realized without incurring the difficulties and time lags associated with finding or training additional experts.

The idea is to just "beam in" agents (experts) to a site (the field) when needed, instead of sending them physically to the site. Sometimes a telephone conversation is just not enough: beyond audio, visual information in the form of video also needs to be transmitted. In this way, a single employee can have a nearly ubiquitous presence.

The invention involves transmitting this video information over very low bandwidth communication links by letting the expert select from a bank of special low-rate "semantic" compression modules. A semantic coder/decoder or compresssor/decompressor pair (codec) does not try to compress and decompress images in order to recreate the full scene in photo-realistic detail. Rather, it only transmits that portion of the scene information which is relevant to a particular task. By drastically cutting the amount of information transmitted, the update rate (number of "frames" per second) can be improved substantially while transmitting over low bandwidth channels. The key is to have a sophisticated, task-specific compressor (computer vision program) at the front end of the video transmission system (i.e., in the field). At the receiving site (referred to as the office), a bank of corresponding decompressor is installed. The expert in the office selects the appropriate codec pair.

Figure 1:
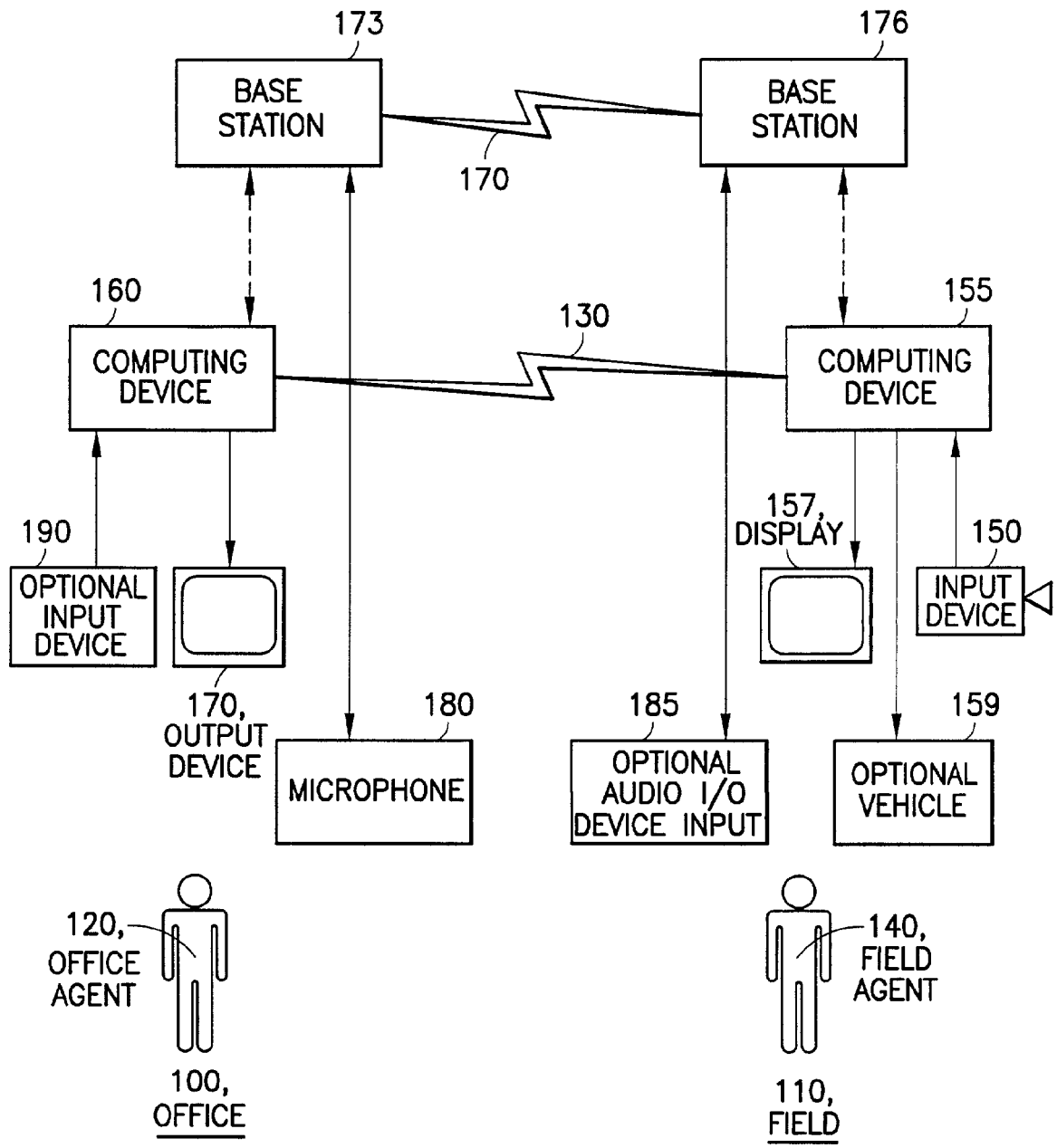
FIG. 1 is a view of the office agent (expert) directing the field agent to monitor, manipulate or navigate something in the field.

Referring now to the drawings, FIG. 1 shows a view of the office agent 120 remotely monitoring, manipulating or navigating something in the field using semantically compressed video transmitted through some low bandwidth channel 130. The office 100 is some location where the human expert 120 (office agent) is located. This location basically can be anywhere where there is access to the low bandwidth channel 130. This channel can be any network, including the Internet, the telephone network, or a private network. The "field" location 110 also has access to this same network. The field location can be some remote site somewhere on earth, or a location that is even more inaccessible such as deep space, planetary surfaces, underwater, or a location which is hazardous to access such as a nuclear power plant or a forest fire area.

The field agent 140 is a human agent or some robot device like a robot arm or vehicle. This field agent carries an input device 150 that includes a computing device 155. Alternatively, the computing device 155 may be located somewhere in the field with wireless high-bandwidth receiving capabilities from the input device 150. The input device is a generally a video camera, which is preferably head-mounted if the field agent is a human being. This video is optionally displayed on display 157. The input device acquires images or moving images that are semantically compressed by computing device 150 based on the task that the human expert 120 is performing (by his remote direction of the field agent). The field agent handles the camera, but the office agent is actively involved in controlling the pointing of this camera (albeit indirectly).

Through communication channel 130, the compressed signal is transmitted to another computing device 160 at the office site 100. This computing device 160 decompresses the signal into visible imagery which is displayed on output device 170. This image does not have to be photo-realistic. The expert 120 may optionally use a microphone 180 to verbally communicate appropriate manipulation or navigation commands to the field agent. The expert also could use some other optional input device 190, like a mouse, joystick, etc., to achieve this. Alternatively this might be a device which has the capability of controlling a number of degrees of freedom. This would allow the office agent to more directly manipulate an object in the field 110, or allow him to navigate an optional vehicle or arm 159.

An optional secondary low bandwidth communication channel 170 is used for audio communication if the field agent is a human. This channel is a bi-directional communication channel between an optional audio I/O input device 180 at the office site 100 and an optional audio I/O input device 185 at the field site 110. The base station 173 at office site 100 and the base station 176 at field site 110 are codecs for the bi-directional audio. This optional channel 170 could, for example, be a phone line. Base stations 173 and 176 can be optionally combined with computing device 160 and computing device 155, respectively.

Figure 2:
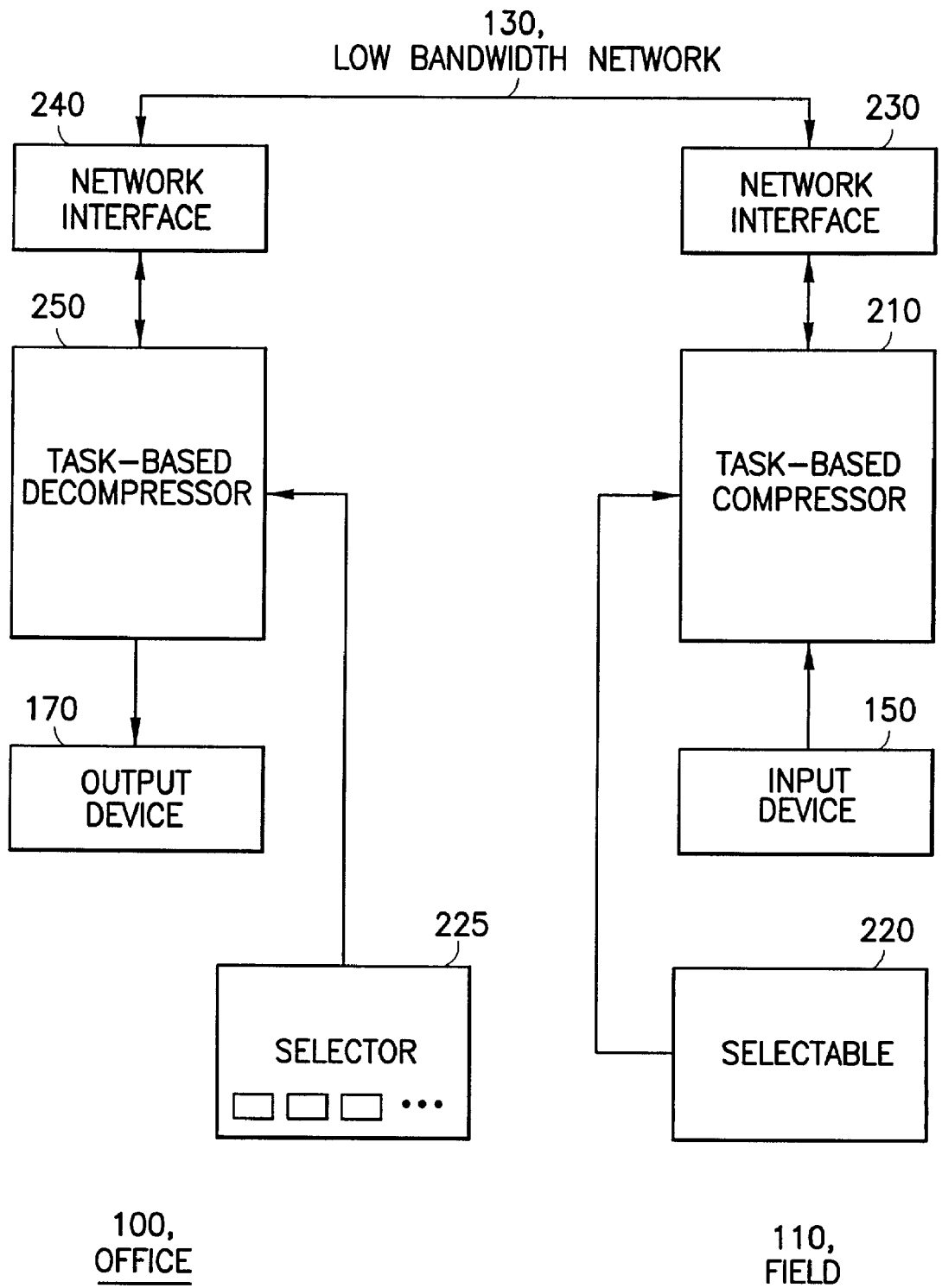
FIG. 2 is a block diagram of the system showing the task-based compression, transmission and decompression of the signal.
Figure 4:
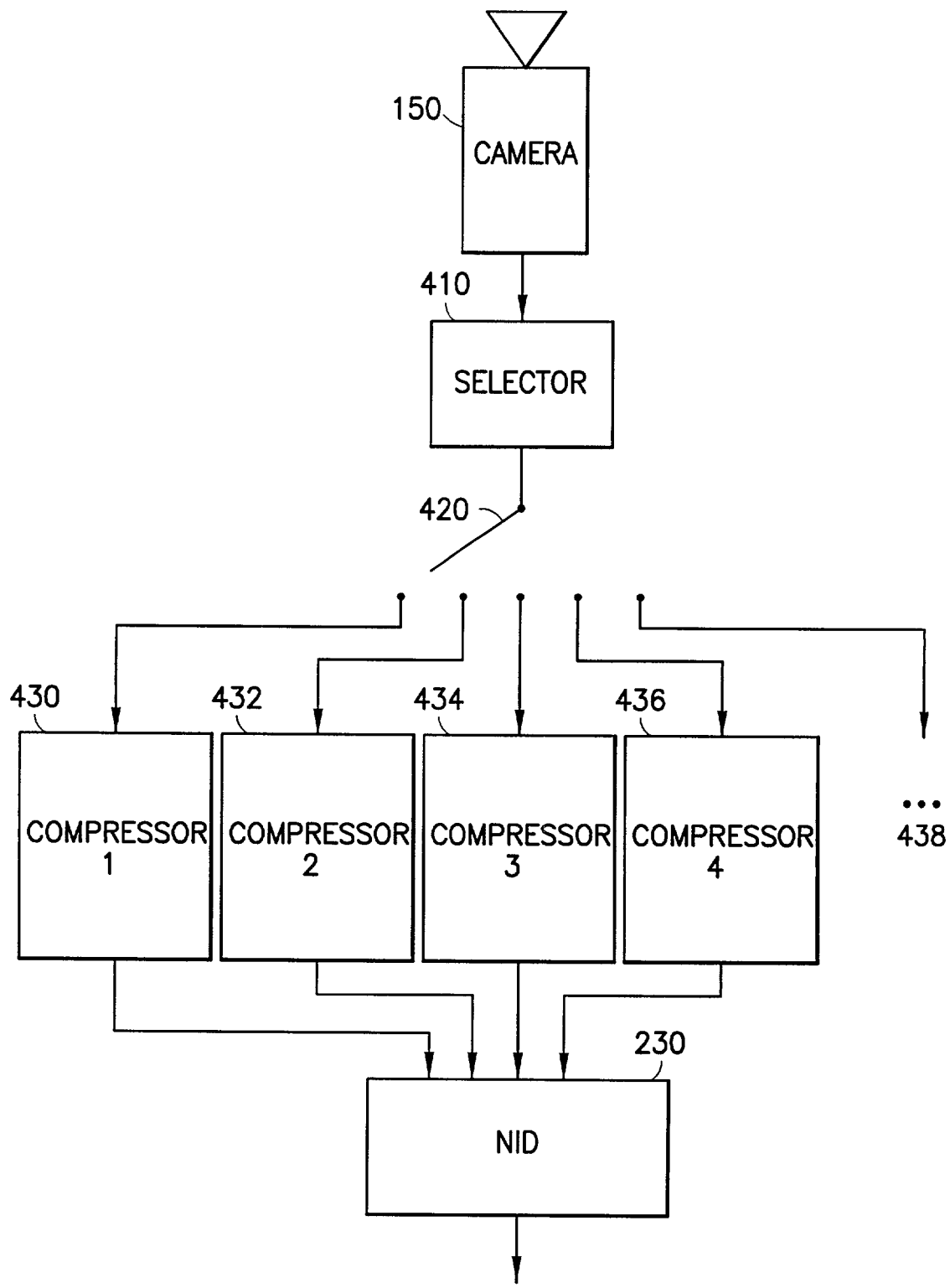
FIG. 4 is a block diagram of the selector for choosing the appropriate task-based compression for the video.

FIG. 2 is a block diagram of the system showing the task-based compression, transmission, and decompression of the signal. Again, on the left, there is the office location 100 and, on the right, there is the (remote) field location 110. There is an input device 150, generally a camera, in the field. The acquired images are compressed by task-based compressor 210. This compressor is selectable 220, in the sense that the office expert may select the type of compression as needed for a specific task by a selector 225. Hence, 210 is a bank of selectable compressors as shown in FIG. 4, and 250 is a bank of decompressor. Blocks 230 and 240 are two network interface devices (NIDs) appropriate for the particular network or channel that is used. This channel is bi-directional with compressed video transmitted from field 110, and possibly audio communication from field agent 140, up to office agent 120 in office 100. In the other direction compressor selections, and possibly office agent instructions for the field agent, are transmitted down from office 100 to the field 110. The task-based decompressor 250 reconstructs the compressed signal into displayable format so that it can be viewed on output device 170. Task-based decompressor 250 and task-based compressor 210 are controlled in tandem by selector 225.

Figure 3:
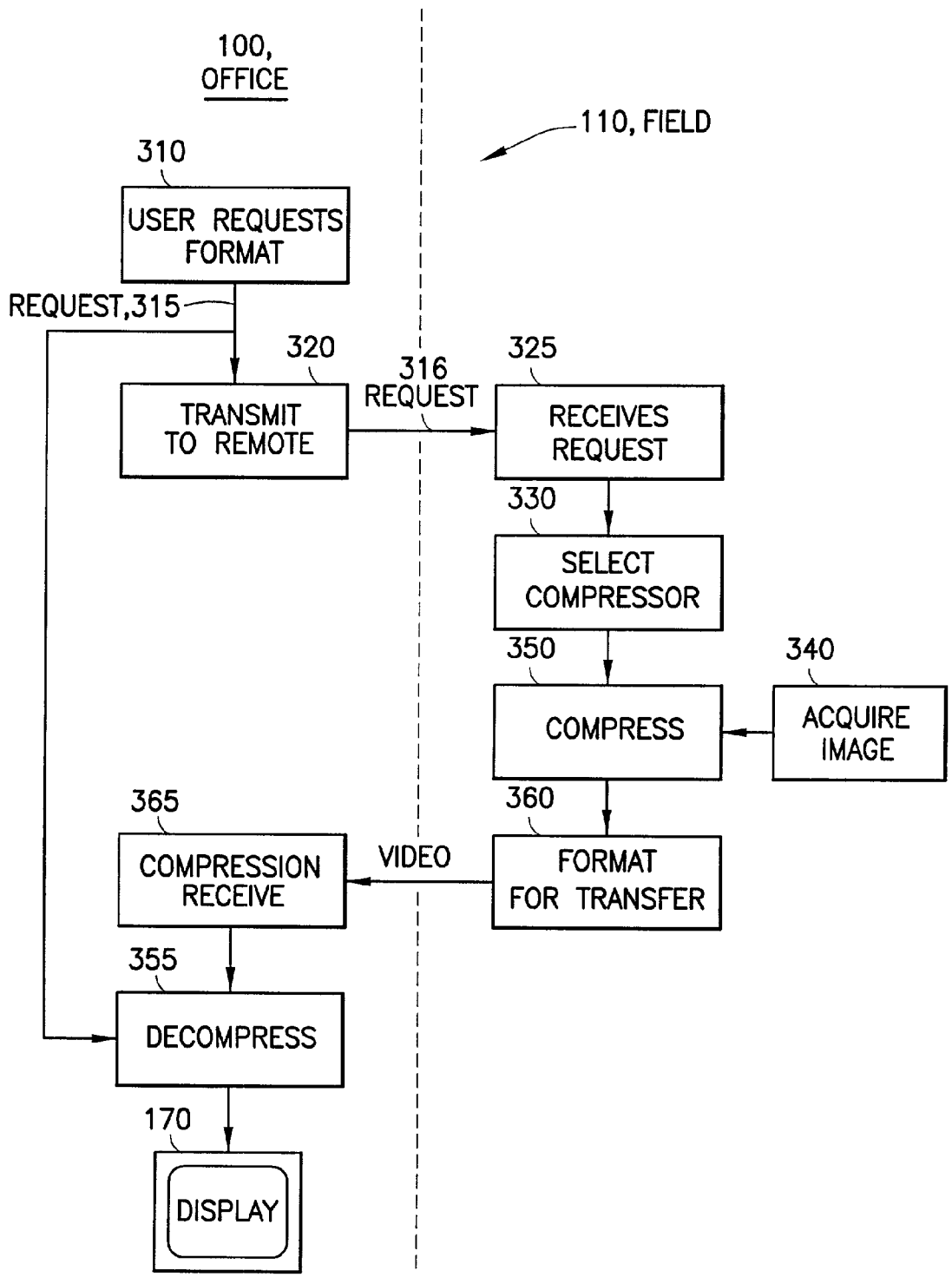
FIG. 3 is a flow diagram of the selection of a task-based compression format followed by compression, transmission and decompression of the signal.

FIG. 3 shows a flow diagram of the selection of a task-based compressor followed by compression, transmission and decompression of the signal. On the left of the diagram is the office location 100, and on the right is the (remote) field location 110. In step 310 the user (the expert 120 in the office) requests a particular format for compression, i.e. selects the appropriate compressor from the bank of compressors shown in FIG. 4. This request 315 is both transmitted 316 to the field 110 and directed to the decompressor 355 at the office 100. In the field 110 the request is received 325 and used to select 330 the requested compressor. That is, selectable 220 task-based compressor 210 is set to perform the proper type of compression 350. At this point, the office site is ready to receive compressed video or images. The video is acquired 340 through some input device 150 and compressed 350 by the compressor selected from the suite of compressors shown in FIG. 4. The compressed video is formatted for transmission 360 in the field and then received 365 at the office site 100. Subsequently, the compressed video is decoded 355 into displayable form and then sent to output device 170, typically a display. Again, it should be noted that the output need not be a photo-realistic rendering of the scene acquired in the field. FIG. 4 shows a block diagram of the selecting process for choosing the appropriate task-based compression of the video. The input to selector 410 takes is the output of camera 150. The selector 410 then is essentially a switch 420 by which different semantic (task-based) compressors can be selected. Here one of a series of different compressors, compressor 1 (430), compressor 2 (432), compressor 3 (434), or compressor 4 (436) may be selected. Many more compressors 438 could additionally be incorporated if so desired. The compressed signals are then input to Network Interface Device (NID) 230, which readies the signal for transport to the office site 100. FIGS. 5-9 show various semantic compressors that could be used. It is also envisioned that two or more different compression techniques could used at the same time, and that at the office site 100 the different decompressed signals would be displayed on a single output device 170, or on two or more output devices.

Figure 5:
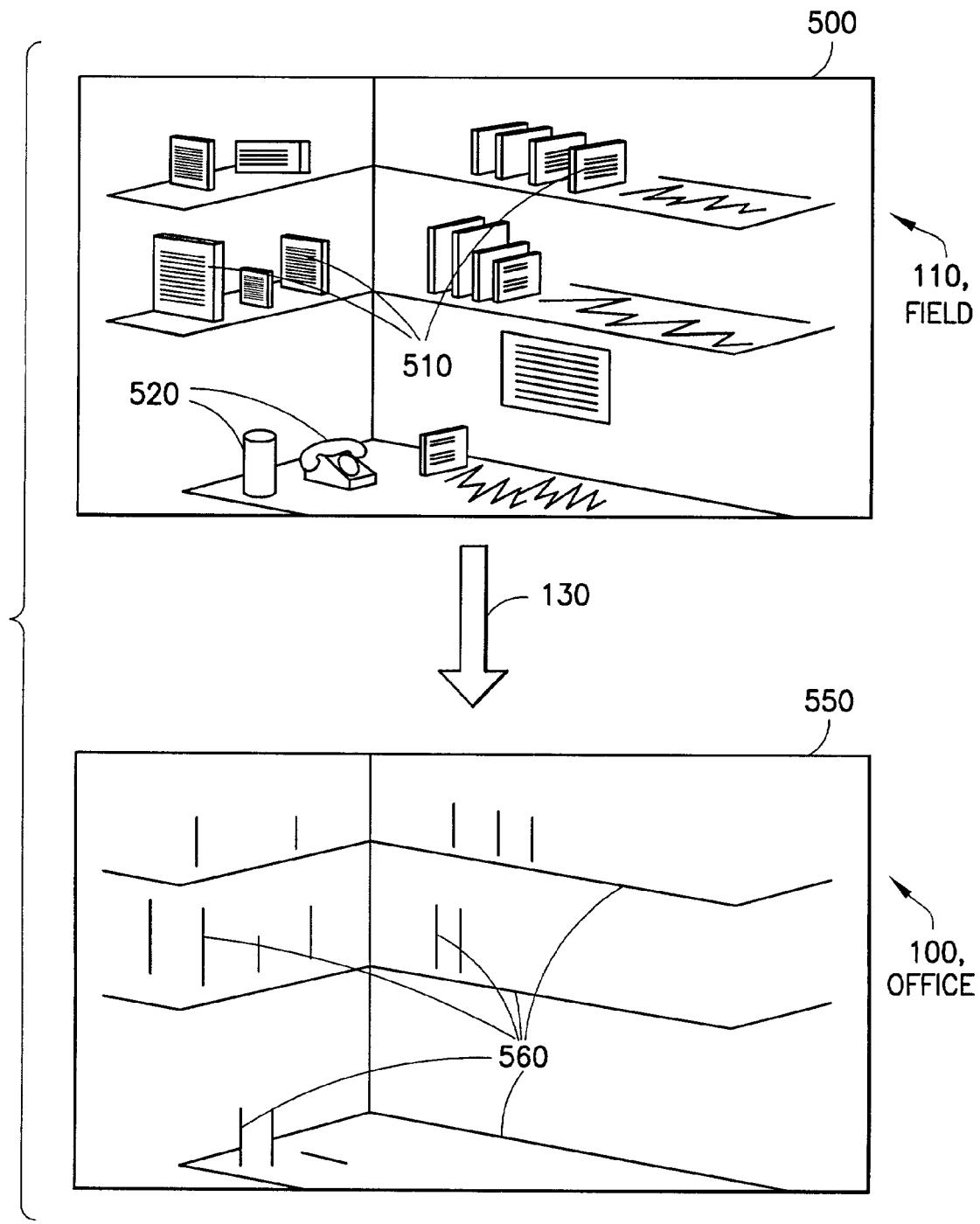
FIG. 5 shows task-based compression based on line finding for navigating and manipulating in predominantly man-made environments.

FIG. 5 shows an example frame 500 from the output video of camera 150 at field site 110 and the corresponding semantically compressed (and then decompressed) frame 550 received at the office site 100. The compressed video is being transmitted over a low bandwidth channel 130 which may be some sort of network or a wireless radio connection. Frame 500 has been processed with an edge detector to find all the edge elements in the frame, while suppressing those in high texture areas (e.g. regions 510). The longest edges (560) are then found using local contour chain-coding and are selectively transmitted to the office site. While this would not generate a "pretty" image at the office site 100, it provides enough information to orient the camera while providing a high frame rate over limited bandwidth. The amount of information, represented by a set of lines or curves 560, is very small for each frame. Hence, this semantic compressor can achieve very high rates of compression.

This is an example of a semantic compressor in "viewfinder" mode where the office agent can quickly see where the field agent is pointing the camera. The office agent can also, in real time (30 frames per second), direct the field agent where and how to move the camera. After the right direction has been established, or at the request of the office expert, a high-resolution "snapshot" could be uploaded at any time. Such a high-resolution image is in the form of image 500—a full photo-realistic or "pretty" image. Pertinent detail 520, which should be viewed at high resolution to formulate instructions on how to manipulate the environment, is then clearly visible. In this application a high frame update rate is much more important than image fidelity. Other applications for this semantic compressor include telepresence operations such as telemanipulation, telemonitoring, tele-inspection, telerepair, etc.

Figure 5A:
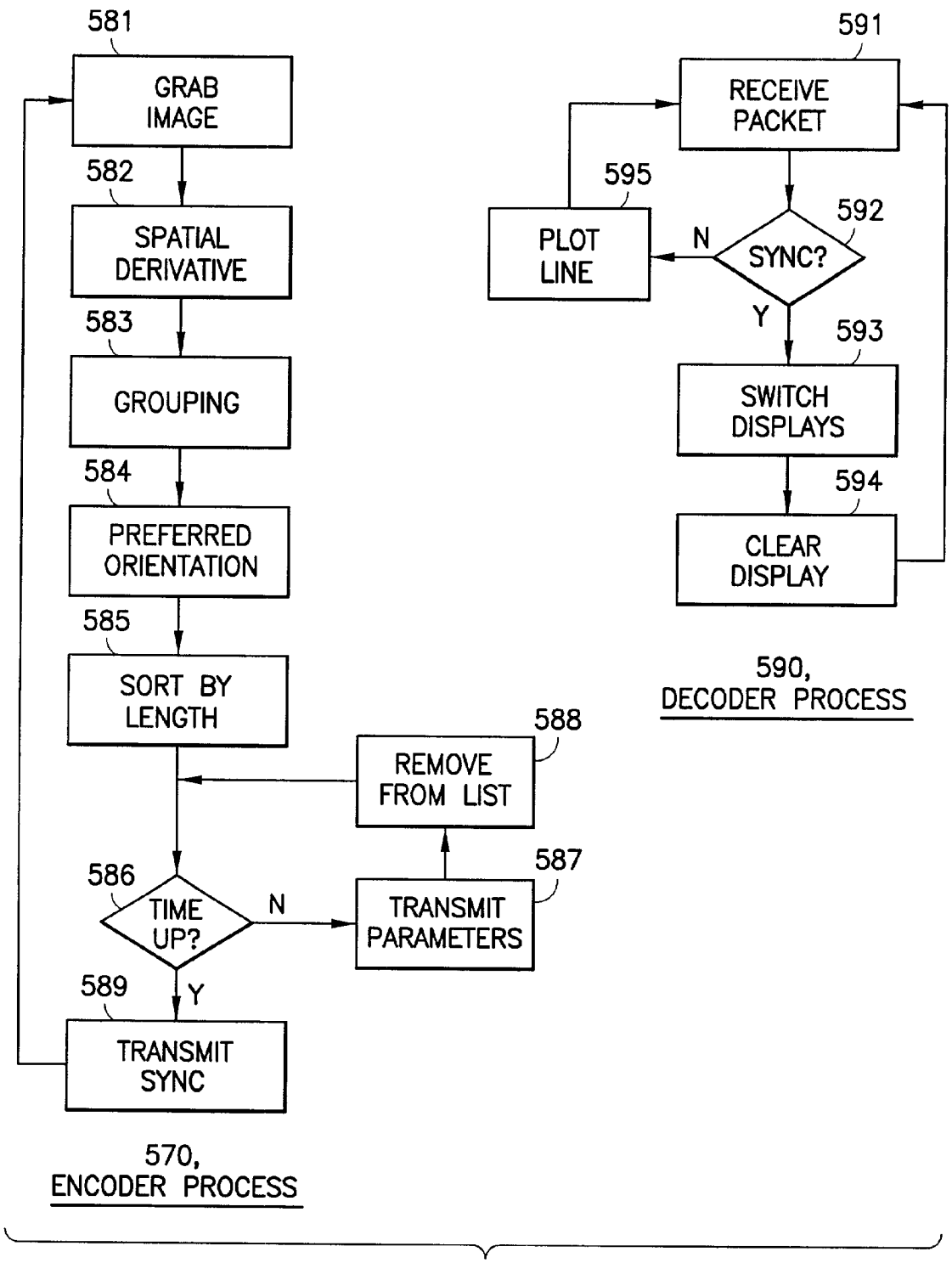
FIG. 5A is a flow chart for a video codec based on selective edge retention.

FIG. 5A shows a flowchart for the compression and decompression process used in as an example in FIG. 5. This process works by selectively retaining edges as generated by a line finder. At the field location runs encoder process 570 shown on the left. First the field unit acquires 581 a scene image and then takes a spatial derivative 582 across the image, such as convolving it with the Sobel edge finder mask set. Next, the responses are thresholded and grouped 583 into linear segments with constant orientation. Step 584 optionally discards lines, such as diagonals, which are not in a preferred direction. Step 585 then sorts the remaining candidate lines by overall length, or some other measure of importance or salience relative to the task. Step 586 checks to see if the full inter-frame interval has elapsed yet. If not, the parameters of the most important line are sent 587 to the office location and the corresponding candidate is removed 588 from the list. Now step 586 once again checks if the inter-frame interval is over (e.g. 33 ms for a 30 Hz update rate). If there is more time available, the process continues around the loop several more times and transmits the parameters of the next few line segments on the sorted list. Typically, many of the detected line segments will not be transmitted since there is not enough time for such a detailed scene description. Once the time has expired, however, a special synchronization message is sent 589 and a new image is acquired 581 by the field system for analysis as before.

To receive such images, the office location runs decoder process 590 as shown on the right of FIG. 5A. Although other setups could be conceived, in the example it is assumed that the office unit has two separate display areas: one for the new image being built up, and one for the last full image so built. When the office unit receives 591 a packet of information from the field unit it first checks whether this is a sync signal 592. If it is a sync, the current working image is transferred 593 to the finished image display area and the working image display area is cleared 594. If the received packet was not a sync signal, the parameters received are used to draw 595 a line in the working image display area. Once a packet is handled through one of these two pathways, the office unit returns to the initial state 591 and awaits the arrival of a new packet.

Figure 6:
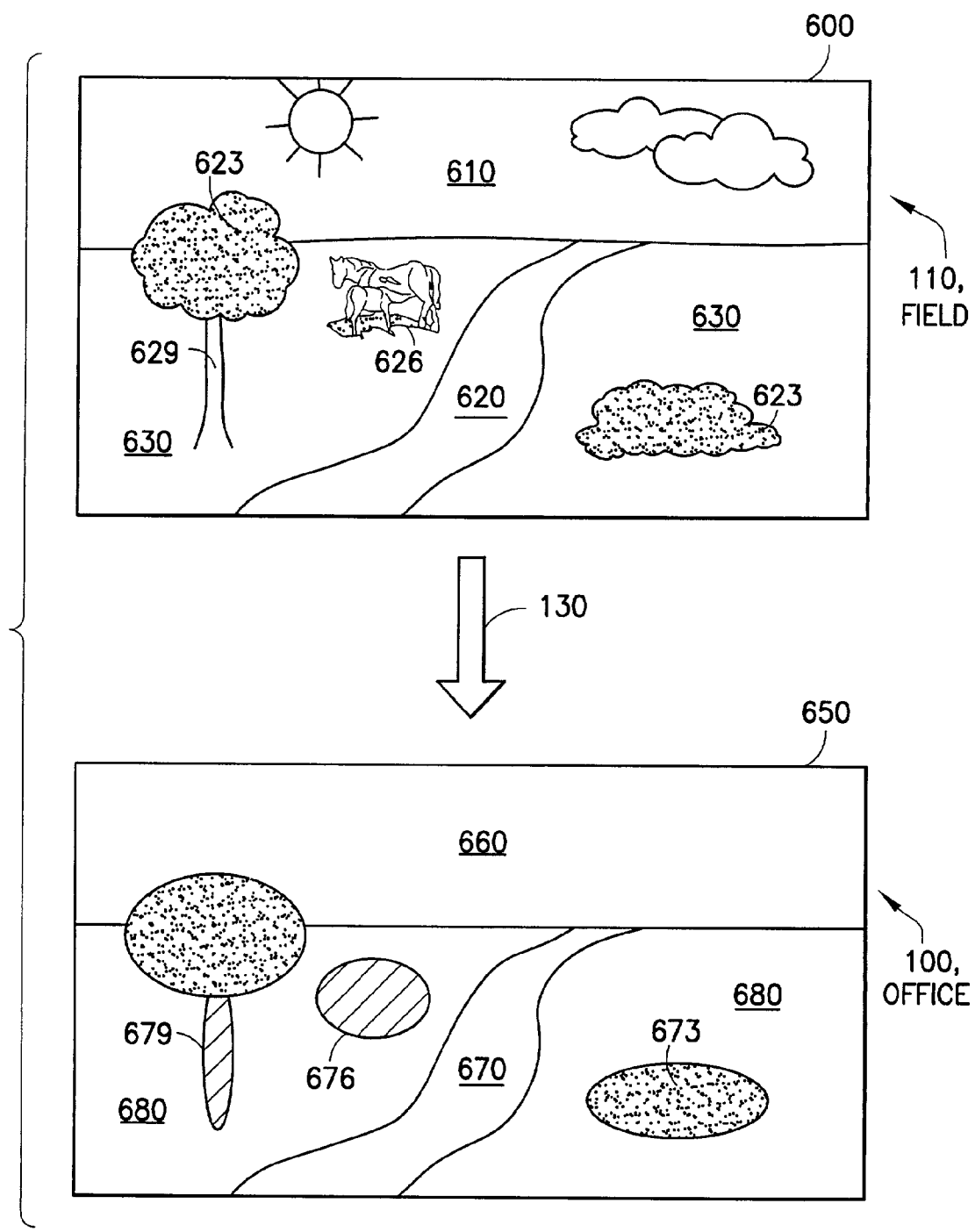
FIG. 6 shows task-based compression based on region finding for navigating in predominantly natural environments.

FIG. 6 shows a different compressor useful for navigating (and possibly manipulating) in predominantly natural (outdoor) environments. An example frame 600 from the camera 150 at field site 110 and the corresponding semantically compressed (and decompressed) frame 650 at office site 100 are shown. Once again, the information necessary to reconstruct image 650 is being transmitted over a low bandwidth channel 130. Here each image frame 600 is processed using region finding techniques. For example, a predominantly blue region 610 on top of the image is displayed as a sky rectangle 660 in the reduced image 650. Other sky features such as clouds and the sun position are omitted as irrelevant to the task. Similarly, regions that satisfy color properties of surfaces that allow for traveling and maneuvering 620, are indicated as schematically as paths and roads 670. Generally, just the boundaries of these regions need to be transmitted; the detailed shading and texture of the road surface can be omitted. The rest of the semantically compressed image 650 is a visual summary. Green textured regions with boundaries, such as 623 (tree tops and bushes), are displayed as leafy blobs in the compressed image 673. Their exact boundary details may not be important and hence additional bandwidth can be saved by sending only a parametric description (e.g., an equivalent ellipse position and dimensions). Or, alternatively, such common recognized items may be deliberately omitted if they are not relevant to the task at hand (in this case, presumably keeping the vehicle on the road). On the other hand, unknown objects such as the horses 626, may be displayed as distinct blobs 676 to alert the office agent. Objects like the tree trunk 629 are also distinctly marked 679—while this is information not directly needed for driving, such obstacles may present significant hazards if the operator loses control in their vicinity.

Again, this is an example of a semantic compressor in viewfinder mode where the office agent can quickly see in what direction the field agent (possibly a robot) is heading. Because the compressed frames can be easily transmitted in real time (30 frames per second), the office agent can give direct, real-time driving instructions to the field agent. As in FIG. 5, a high-resolution snapshot may optionally be uploaded at any time. Such a high-resolution images are in the form of image 600, either full pixel information or compressed with a general perceptual codec like JPEG. Potentially pertinent detail, such as 626, are then clearly visible. It is also possible to only transmit certain selected regions at photo-realistic quality.

Figure 6A:
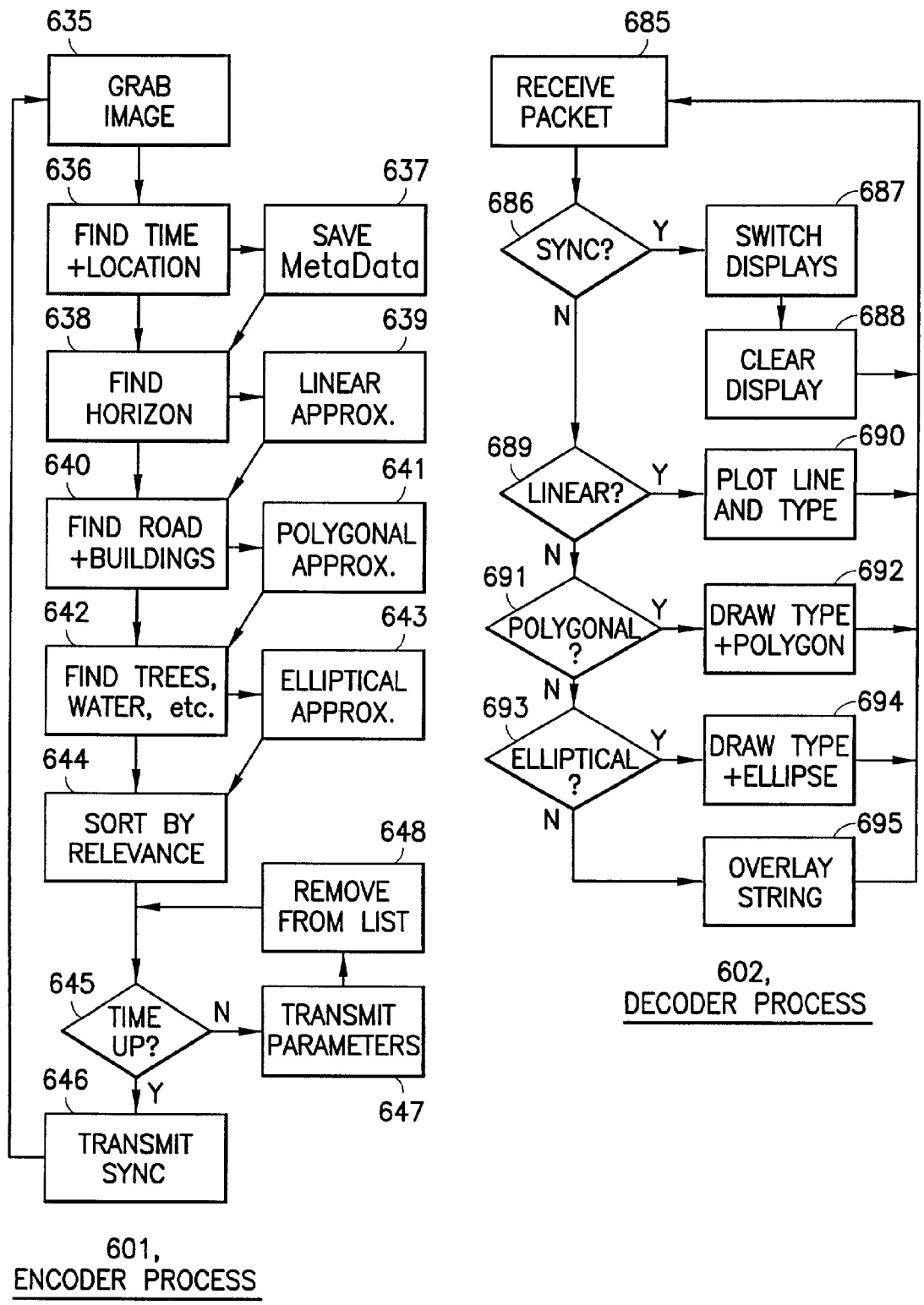
FIG. 6A is a flow chart for a video codec based on region segmentation.

FIG. 6A shows a flowchart for the region segmentation codec used in the driving example of FIG. 6. The field unit executes encoder process 601 which is based on sophisticated computer vision techniques for understanding the scene. In step 635 the field unit acquires an image and then optionally determines the current time and location 636 (perhaps from GPS) and saves this as meta-data 637 on an internal queue. Next, it finds the horizon line of the scene 638 and saves a single line approximation 639 on the queue. Then it looks for extended terrain features 640 such roads, buildings, forested areas, boundaries of large bodies of water, etc. and forms sparse polygonal approximations 641 to the edges of such areas. Similarly, it step 642 the field unit identifies compact entities such as trees, bushes, rocks, puddles, etc. and forms elliptical approximations to them 643. These ellipses capture the centroid of the region, its overall orientation in the image, and its approximate spatial extents (major and minor axes). The ellipses from step 643, as well as the polygonal approximations from step 641, are also stored on the internal scene analysis queue.

Step 644 then takes the entire queue which has been developed and sorts it by each item's relevance to the overall task. In the case of driving it may critical to know the vehicle's absolute position and attitude. Thus the time/place meta-data and linear horizon approximation would be given high priority. The next most important things might be the polygonal approximation of the road boundaries, and the elliptical approximations of any rocks or other obstructions lying in the road region. All the other computed entities would be assigned lower priority. Step 645 checks whether there is any time left for transmitting information about the current frame. If so, the parameters of the most important item from the queue are transmitted 647 to the office unit and the item is removed 648 from the queue. Once an item is transmitted, the remaining inter-frame time is checked again 645 to see whether more items can be transmitted. If not, a special sync signal is sent 646 and a new image is acquired 635 for analysis. In this way the most important items are guaranteed to be sent to the office unit, with the less important scene elements being communicated as bandwidth allows.

To receive a video stream coded in this fashion, the office unit runs decoder process 602 shown on the right of FIG. 6A. It first receives a packet of information 685 from the field unit and checks whether it is the special sync signal. As in the previous decoder detailed in FIG. 5A, we assume the office unit has two display areas. When the sync signal is received, the image which was being built is transferred 687 to the finished display area and the image assembly area is cleared 688. If the packet was not a sync, step 689 checks whether is was a linear approximation. If so, it plots 690 the corresponding line in the image assembly area and either tags it with the appropriate type (e.g. "horizon") or renders it in such a way that its type is evident (e.g. blue above, green below). If instead the packet is determined to be a polygonal chain code 691, the polygon is rendered 692 in the image assembly area with an appropriate style or annotation to describe its type. If the packet is an elliptical approximation 693, the received parameters are used to draw 694 a color-coded ellipse in the assembly area. Finally, if the packet was none of the other types, it is assumed to be meta-data and is displayed as a textual string 695 in some appropriate area of the reconstructed image (such as a corner).

Figure 7:
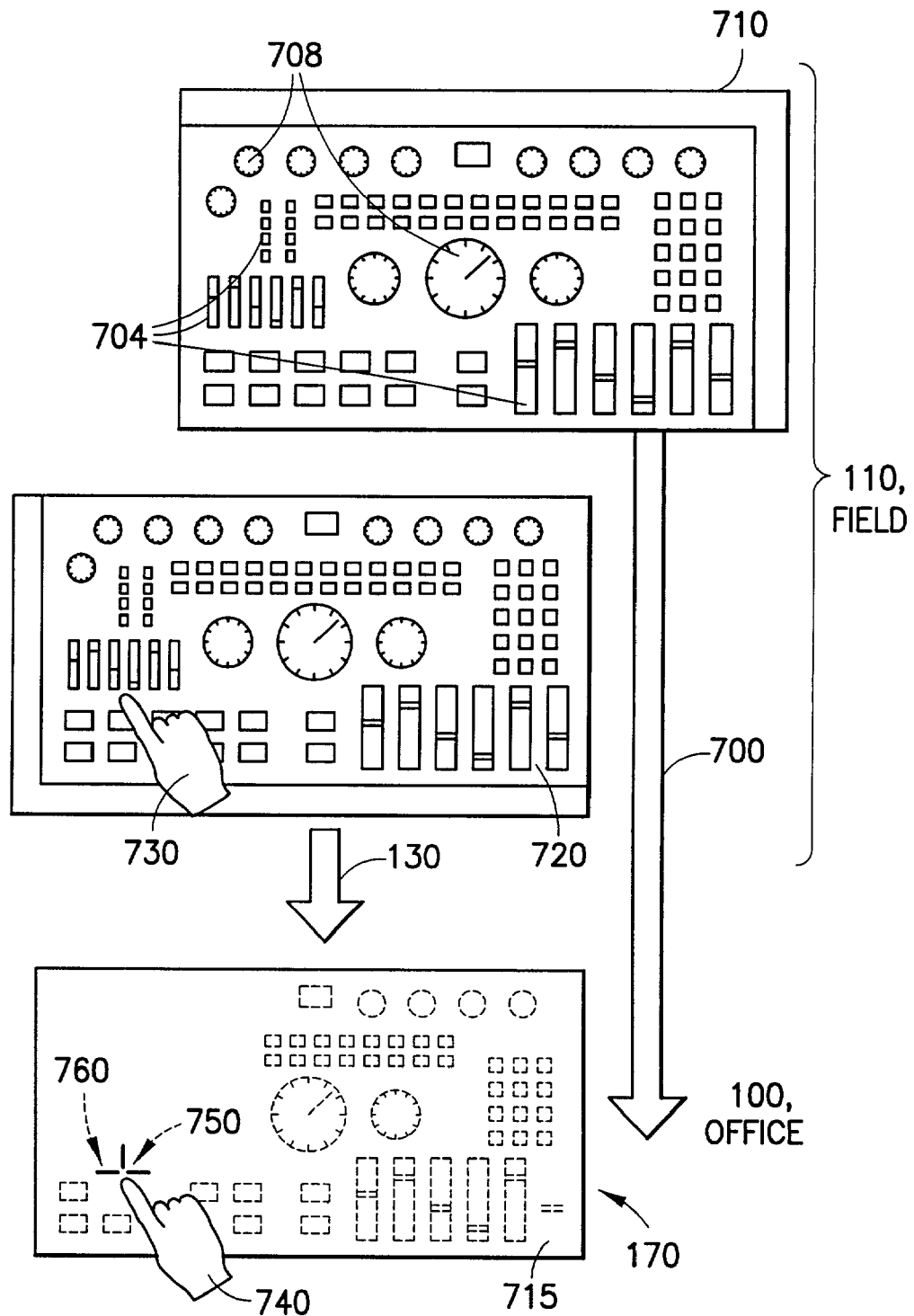
FIG. 7 shows task-based compression for manipulating known environments based on models or high-resolution images of the manipulated object.

FIG. 7 shows task-based compression for manipulating known environments based on models or high-resolution images of the objects that need to be manipulated. Sometimes the office agent may need to coordinate with a field agent in field 100 to designate which control or subassembly of a machine should be adjusted. This might be accomplished by first sending 700 a high resolution image of the affected control panel, even if it takes (say) 30 seconds. This high-resolution image could be the segmented control panel image 715 from image 710. On the instrument panel there may be both control instruments 704 and measuring instruments 708. The received image 715 could then be displayed as a static snapshot on output device 170 in the office environment 100. The field computer 155 at the camera end 150 then realigns each new 720 image with respect to this reference shot and finds where the field agent 110 is currently pointing. This might be accomplished using a combination of flesh tone and motion processing to segment the agent's hand 730 from the image 720. Now all that needs to be up-linked 130 to the office agent 120 is the location that the field agent is pointing to 750, and possibly the position and orientation of the agent's hand 740. To the office expert this might be shown as a cross-hair cursor 760 on the saved high resolution image 710. Since pointing information only requires a few bytes, the update rate could be very fast thus giving a tight response loop.

Alternatively, a model of the instrument panel 710 could be available to both the field computer 155 and the office computer 160. The field computer then matches the images 720 to the model (as opposed to a previous image) and determines the position of the field agent's hand 730 with respect to the model. Again, all that needs to be up-linked 130 to the office agent 120 is the position of the agent's hand 740 and possibly the location that the field agent is pointing to 750. To the office expert this could be shown as a cross-hair cursor 760 on a rendered image 715 of the model of the instrument panel in 710.

Figure 7A:
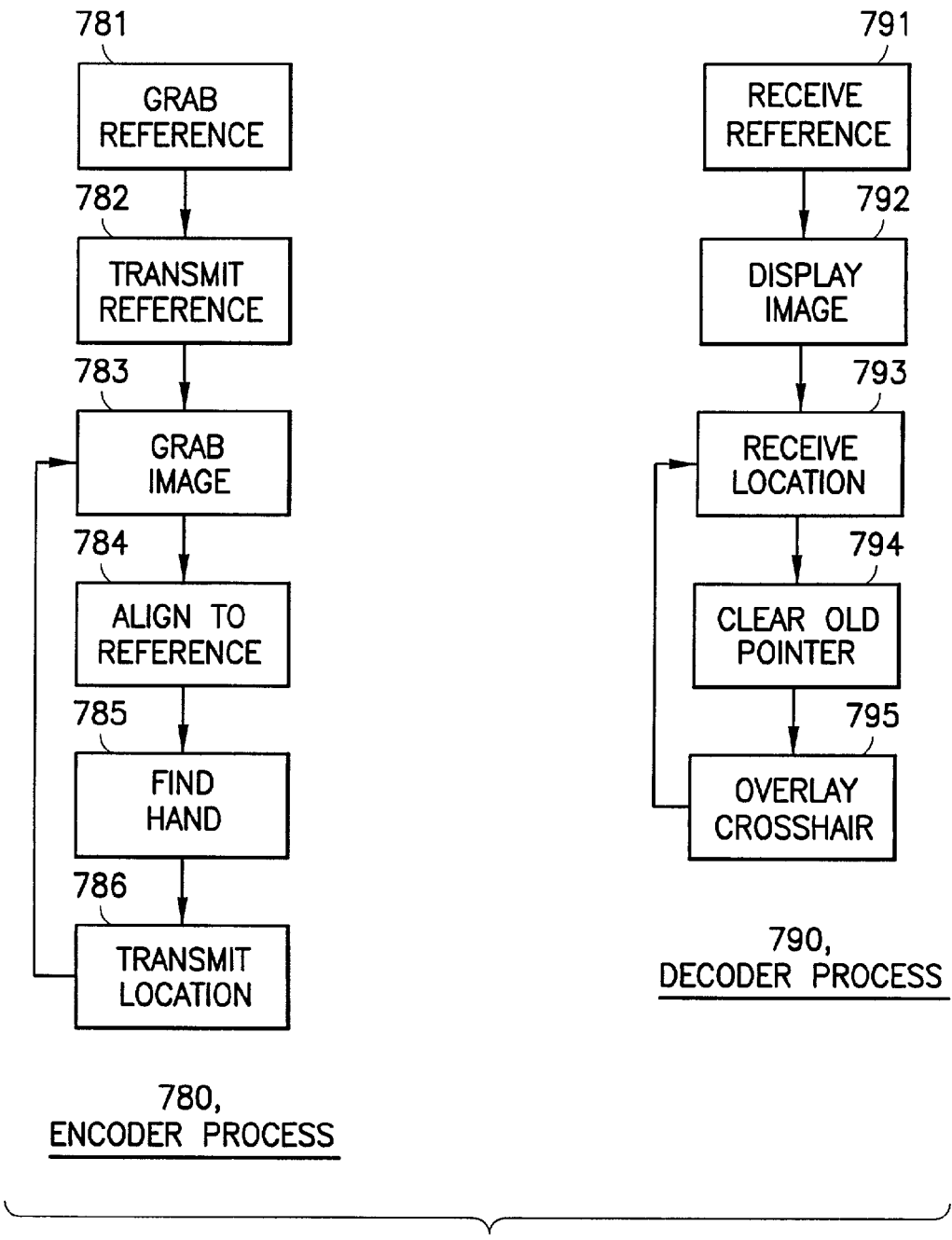
FIG. 7A is a flow chart for a video codec based on object tracking.

FIG. 7A shows the flowchart for the object tracking codec used in this example. The field unit runs encoder process 780 shown on the right. First it optionally grabs a reference image 781 and transmits it 782 to the office unit. This would usually be accomplished through some standard static image compression technique such as JPEG coding. Alternatively, both the field unit and office unit may have a suitable pre-stored background image (e.g. if it is a standard control panel) and hence merely need to agree on which image will be used. After the reference image is established, the system is switched over to the special object tracking codec. Here it first acquires a new scene image 783 and aligns it 784 to the known reference image to account for any camera motion. It then employs a special detector 785 that finds human hands (or some other designated object for which it has a detection procedure). Finally the position of the hand, or the tip of the finger if the hand is pointing, are transmitted 786 to the office unit and the field unit acquires another image 783 to repeats the cycle.

The associated decoder process 790 is straightforward. First, the office unit receives the static reference image 791, or agrees with the field unit about which canned image will be used. It then displays 792 this background image to the user and awaits location packets from the field unit. When a pointer location is received 793, the office unit erases 794 any previous pointer indication from the image and then renders 795 the new pointer location in some appropriate fashion on the display. To accomplish step 795 it might choose to use cross-hairs, an arrow, a graphical icon of a hand, etc. After this is done, the office unit awaits the receipt of another location packet 793 and performs a similar update of the cursor.

Figure 8:
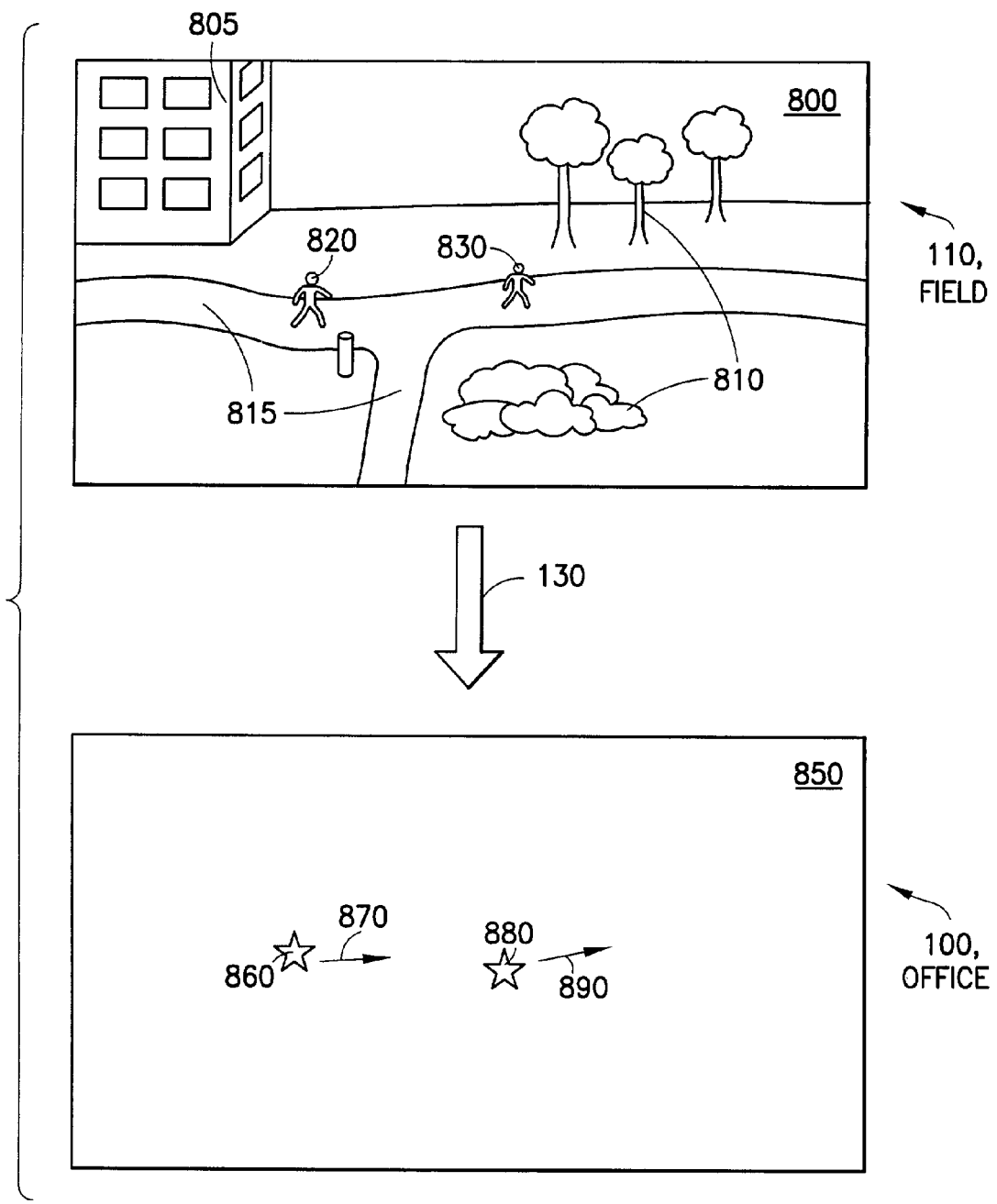
FIG. 8 shows task-based compression based on models of the objects that need to be detected for monitoring known environments.

FIG. 8 shows a related task-oriented compression technique for monitoring known environments based on models of the objects that need to be detected or based on motion detection. Camera 150 in the field 110 is monitoring an area and acquires image 800. The scenery in this area contains man-made objects 805, natural objects 810, and walking paths (or roads) 815. The system for remote low-bandwidth monitoring is intended to detect moving objects, such as people 820 and 830. Such objects can be easily detected by motion analysis, for example, by background substraction.

First, consider the case where camera 150 is fixed and the area captured in image 800 is known and relatively unchanging. The image may also be known a priori at the office site 100. To reconstruct the current scene at the office site 100, all that needs to be transmitted over channel 130 are the locations 860 and 870 of the detected moving objects 820 and 830, respectively, and possibly their velocities, 870 and 890. This is enough information to construct an image like 850 which can then be overlaid on the known image of the field area. This resultant image gives a high-resolution image of the monitored area with symbols superimposed representing the moving objects 820 and 830. In addition, rough two-dimensional models of the objects of interest (humans, cars) can be matched to moving object images to help visually indicate object type. When specific conditions occur, such as two people coming together then stopping, the system could be switched to another codec pair to send a high resolution snap-shot of the meeting or a short video of their interaction. Such conditions might be detected automatically, or through the intervention of a human operator.

If the camera 150 in FIG. 8 is non-static, a high-resolution image of the monitored area 800 can be uploaded to the office 100 periodically. This image, then, is used as the background to compose a real-time video with moving objects 820 and 830, represented by 860 and 880, superimposed in the form of symbols like stars. A possible application for this codec is the monitoring of traffic patterns at remote roads and highways (the field, in this case).

Figure 8A:
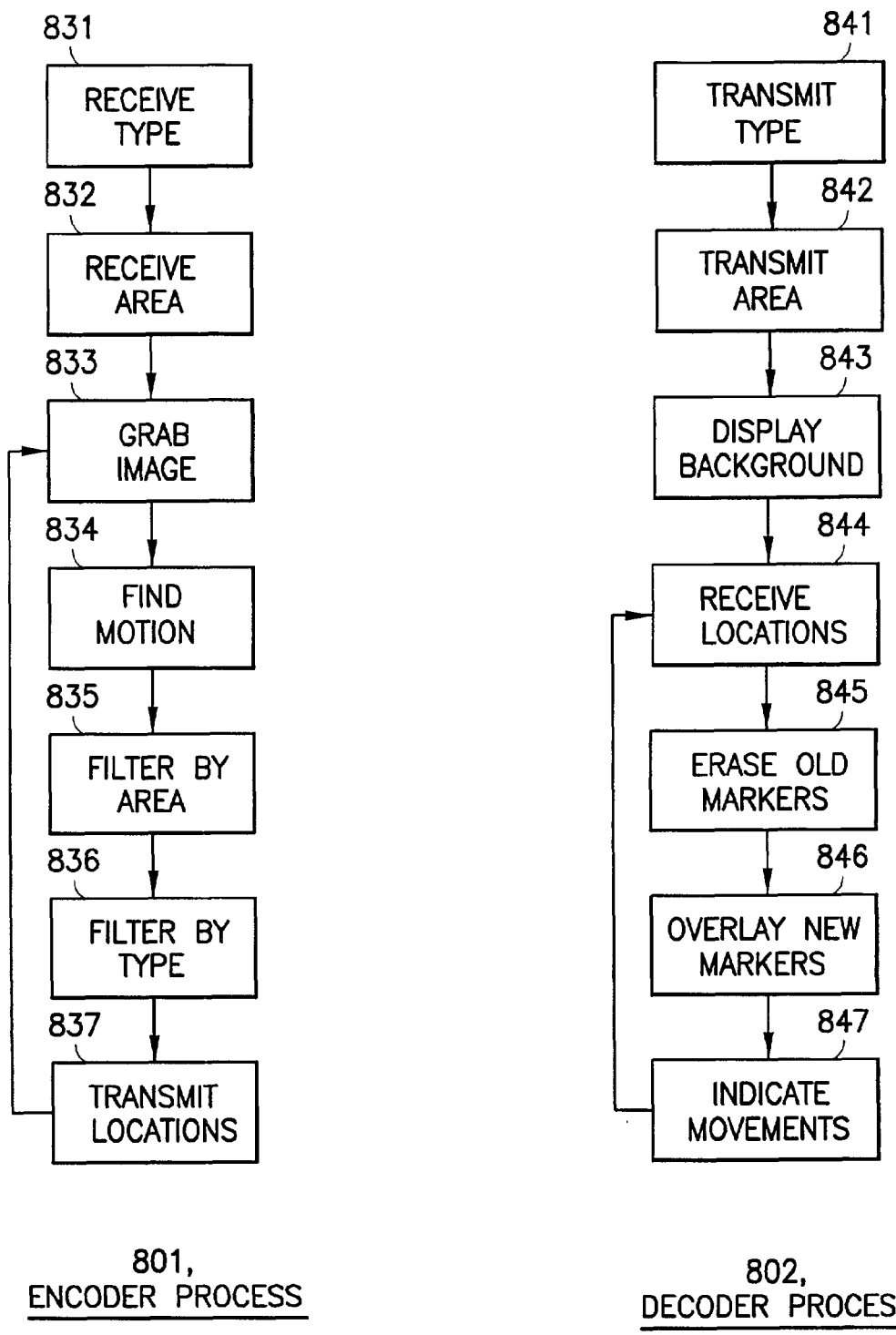
FIG. 8A is a flow chart for a video codec based on motion segmentation.

FIG. 8A shows the flowchart for a suitable semantic codec based on motion segmentation. In encoder process 801 shown on the right, the field unit first receives some sort of specification concerning the type(s) of object to track 831, and possibly a restricted area of interest 832 as well. It then acquires a scene image 833 and looks for regions of high motion 834. This might be done by simple image differencing, optical flow calculations, blob tracking, feature correspondence, or some other method. The detected regions are then pruned 835 by removing candidates which lie outside the region of interest (if supplied). Finally, the remaining regions are further filtered 836 to determine if they correspond to objects of the appropriate type(s). This might be based on oscillatory motion of the legs if the desired objects were humans; or large size, consistent motion direction, and low acceleration if the desired objects were vehicles. In step 837 the image locations of the detected targets are transmitted to the office unit and the cycle repeats. Typically there will be very few targets so all their locations can be sent. However, for very "busy" images it may be necessary to prioritize the targets so that at least the most "important" ones (as determined by the nature of the task) get transmitted.

The corresponding decoder process 802 is fairly simple. First the office unit transmits some specification of the type(s) of targets it is concerned with 841, and possibly some constrained image region in which to look for them 842. The office unit then displays to the user a background image representing the area being monitored. This may be a standard stored image acquired in the past through some other means, a high-resolution image of the scene transmitted with a different codec pair, or a symbolic graphical rendition of the remote environment. The decoder then waits for a set of object locations 844. When this occurs, the decoder erases 845 any old object markers which might be on the display, and overlays 846 onto the static background image new markers for the detected objects at the image locations specified. These markers might be different colors or shapes for different object types, or have textual labels printed next to them to indicate their type. Step 847 then optionally modifies these marks to indicate object movement directions and speeds. This might be done either by attaching vectors to the object icons, or by some other method such as modulating the intensity of each icon in proportion to its speed.

Figure 9:
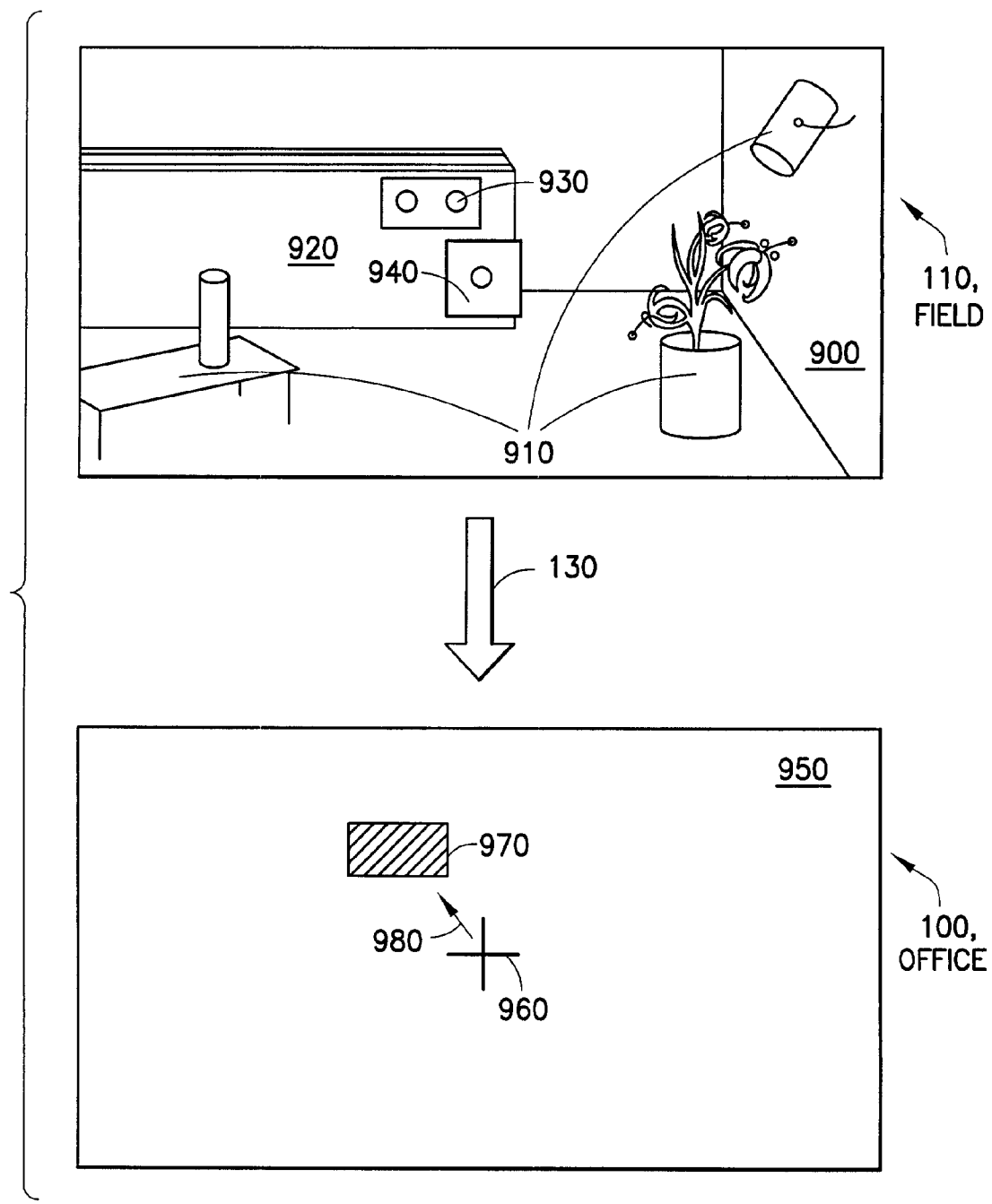
FIG. 9 shows task-based compression for manipulating environments based on normalized correlation and models of the object that needs to be manipulated.

FIG. 9 shows a task-based compression for manipulating environments based on correlation and models of the object that needs to be manipulated. Here, the task is to aid the field agent in finding desired objects. Image 900 is from field locale 110 where images are acquired by camera 150. The camera has a view of some man-made or natural environment that contains objects 910. The view also contains the object of interest 920 (a radiator) and a part 930 of it (the thermostat) that is of particular interest. Further, this view may contain a projected laser pattern 940 centered at the field of view of camera 150. This pattern is visible to the field agent directly— no display device is required. Ideally such pattern would have a discernible orientation and size (not just a dot) to help the field and office agents communicate about directions and distances. Alternatively, the field agent may see a similar pattern superimposed on the scene in the camera viewer.

The specific task is to help the field agent find the heater controls 930 so that he can be directed to adjust these controls. To do this the position of the target 930 is directly detected at the transmitter end 110 (the field) by the field computer 155 using a technique like normalized correlation, or region finding techniques such as were used to locate the field agent's hand in FIG. 7. The amount of information that needs to be transmitted is just the location (and possibly size) of the target 970, which can be easily achieved even with severely limited bandwidth. The lower image 950 is the office view with a cross hair 960 corresponding to the center of the field of view of camera 150 (equivalent to the laser pattern visible to the field agent). This view further shows the location 970 of the target 930 (heater controls) with respect to the cross hair 960. The office agent can then direct the field agent how to move the camera in order to make the target appear at the center of the camera view (e.g. "look higher and a little to the left"). In image 950 this direction is 980. This interaction continues until the cross hair 960 in the lower image 950 is on top of the target location 970. When this alignment is achieved, in the field 110 the laser marker 940 appears directly on the target 930 in (or the designated target appears in the center of the field agent's display). The office agent and the field agent thus have reached an agreement about what item is being talked about and can proceed with the assigned task.

Figure 9A:
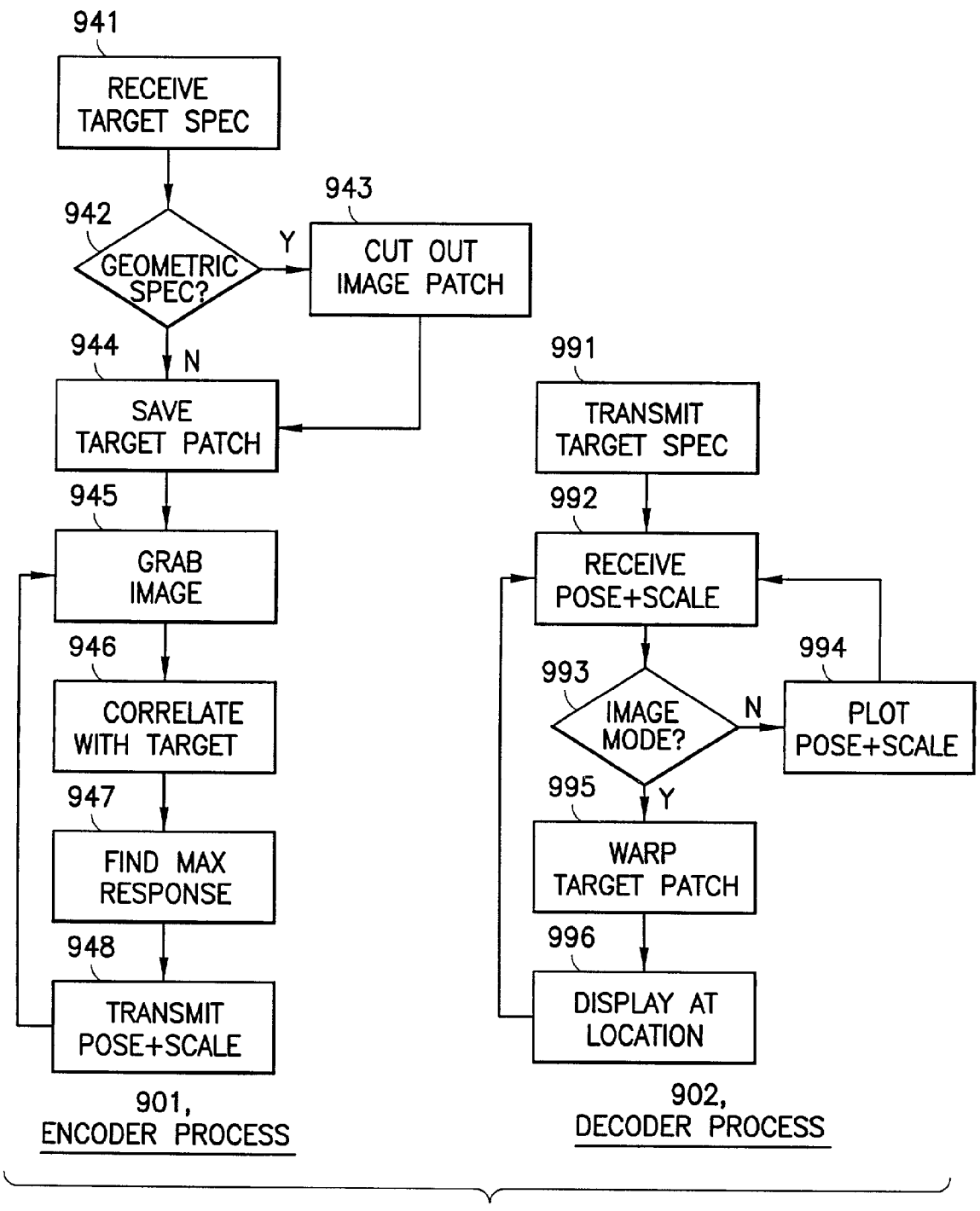
FIG. 9A is a flow chart for a video codec based on template matching.

FIG. 9A shows a flowchart for this sort of template matching codec. Encoder process 901, shown on the left, first waits to receive some sort of target specification 941 from the office unit. If this is determined to be a geometric specification 942, an appropriate area of some image is extracted 943 and saved 944 as the target template. For instance, the office unit might transmit the center and size of a rectangle relative to the last high-resolution image transmitted (using a different codec pair). The portion of the image within this rectangle would then be cut-out and used as the target to match. If instead the field unit receives an actual image patch, it is merely stored 944 for later use.

In the main loop, encoder process 901 first grabs a scene image 945. It then compares 946 the target template to this image at various offsets and possibly with various rotations and scales. Such comparisons might be done by normalized correlation, the generalized Hough transform, sum of absolute differences, geometric hashing, or some other technique. The maximum response(s) are then found 947 and the corresponding position and orientation (together called "pose") and scaling factor are transmitted 948 to the office unit. There may be either a single target identified, or multiple targets (possibly of different types), depending on the task.

To reconstruct displays based on this coded video stream, the office unit executes decoder process 902 shown on the right side of FIG. 9A. First, the office unit specifies 991 which sort of target(s) are relevant either by sending a full target image patch, a geometric sub-area specification relative to some previous image, or an agreed upon designator for some standard stored target template. The office unit then receives 992 the pose and scale of the detected target(s) from the field unit. If an image-like display is desired 993, the received parameters are used to transform 995 the known target image patch to have the correct orientation and scale (and possibly shear). The transformed patch is then rendered 996 in the user display at the position determined by the field unit. Alternatively, for a more basic graphical mode as shown in FIG. 9, a simple target indicator might be displayed 994 at the appropriate location instead.

Figure 10:
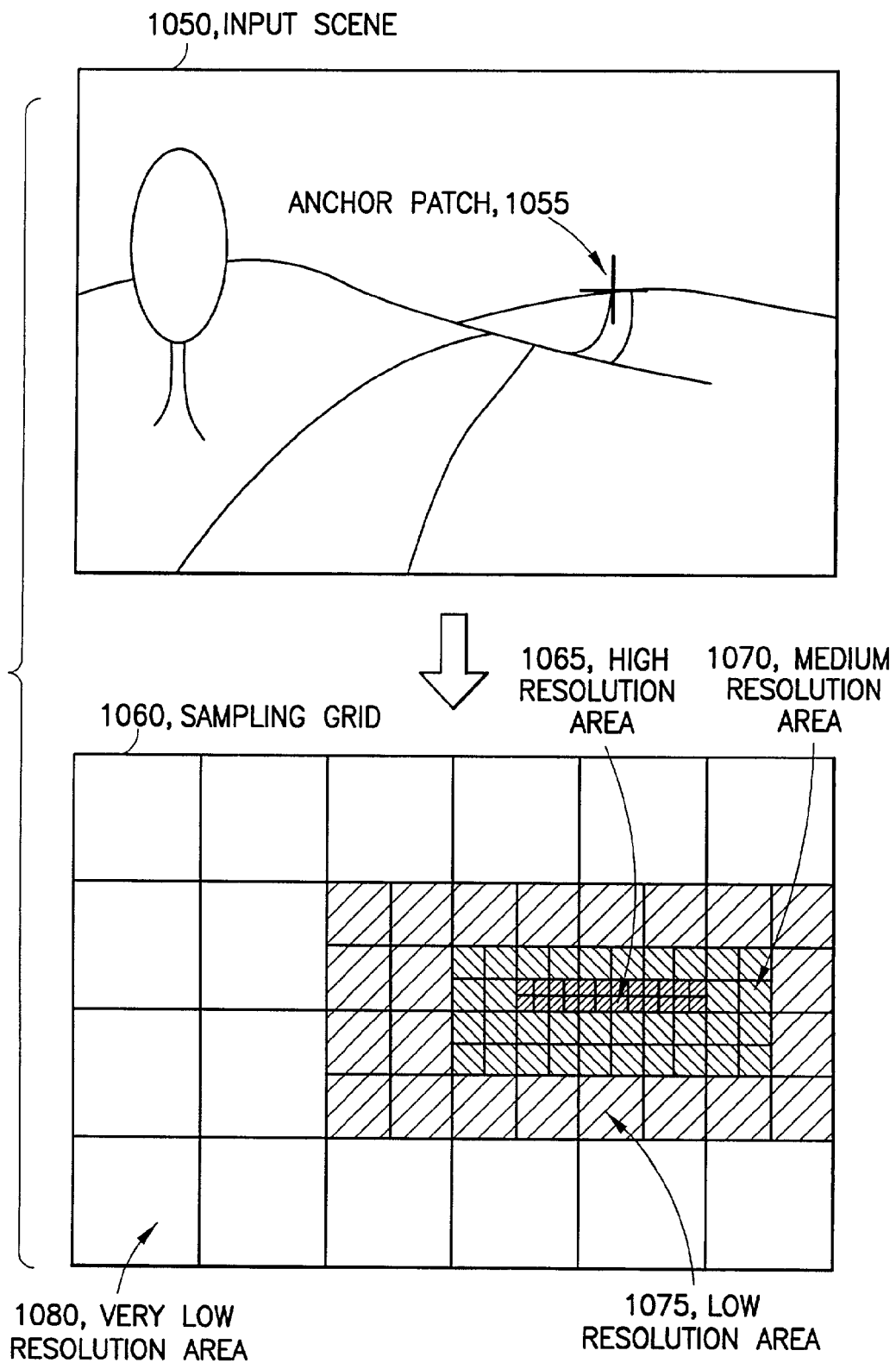
FIG. 10 shows task-based compression for driving based on variable spatial resolution.

FIG. 10 shows still another codec based on varying the spatial resolution of the encoder. In each input image 1050 the location of an anchor patch 1055 (some local feature) is sought by the compressor. Once this is found a grid 1060 with varying pixel sizes is laid over the image. There is a high resolution region 1065 near the position of anchor feature 1055, with a surrounding region of medium resolution 1070. Further from the anchor there is a region of low resolution 1075 and then a region of very low resolution 1080. Instead of transmitting the full detail contained in the patch covered by a subregion (pixel) in this grid, only some statistical digest is sent, such as the average gray value (the patch value).

This varying spatial resolution drastically cuts down on the number of pixels sent and thereby improves frame rate for a given bandwidth. Yet this scheme still retains details in areas crucial to a particular task. For instance, the task might be to remotely drive some vehicle down a road. Here it would be beneficial to retain a constant-size rendition of the surroundings. That is, the number of pixels covering an object should depend on its true physical size. If a flat ground plane is assumed, then things near the horizon are farthest away while things below the horizon in the image are progressively closer. Thus physically big things of interest near the horizon will appear smaller (cover fewer pixels in a uniformly sampled image) than similar sized objects lower in the image (hence closer to the camera). Therefore a variable resolution resampling might be chosen that specified high resolution at the horizon with a progressive fall off (bigger sampling areas) lower in the image. Furthermore, if the overall task is to drive along a road, then image regions far from the road are less important to achieving satisfactory control and hence could also be reduced in spatial resolution.

Assigning a static grid with varying resolution may be appropriate for some applications, such as inspection. However, in general it is contemplated that the grid itself will be moved from frame to frame. In the original image 1050 of FIG. 10 the anchor point 1055 is assigned to the farthest place where the road vanishes over a hill. As the vehicle drives along the road its camera will bounce and perhaps rotate due to bumps in the road, etc. For this reason it is desirable for the codec to relocate the anchor region (patch) 1055 in each new image and possibly estimate its new orientation as well. Then the spatially varying sample grid 1060 is laid down on the image 1050 so that it is aligned with the new location and orientation of this designated anchor point 1055.

It is contemplated that the grid subregions do not necessarily have to be square and might be some other shape more suited for the application. Also, it is contemplated that the size of the grid cells might not vary linearly with displacement from some point. First, they might vary in some other fashion such as parabolically or logarithmically. Second, the distance from something other than a point feature might be considered, such as the distance from a line segment or 2D image patch. Third, the grid cells do not necessarily have to be aligned with the coordinate axes of the original image. For instance, if the horizon line was tilted at 10 degrees, it would make sense to tilt all the grid cell boundaries by 10 degrees also. Finally, although in a preferred embodiment the varying spatial resolution is achieved by averaging values over a rectangular region (patch value), a nonblock-based method such as wavelets with varying scales could be used instead.

Figure 10A:
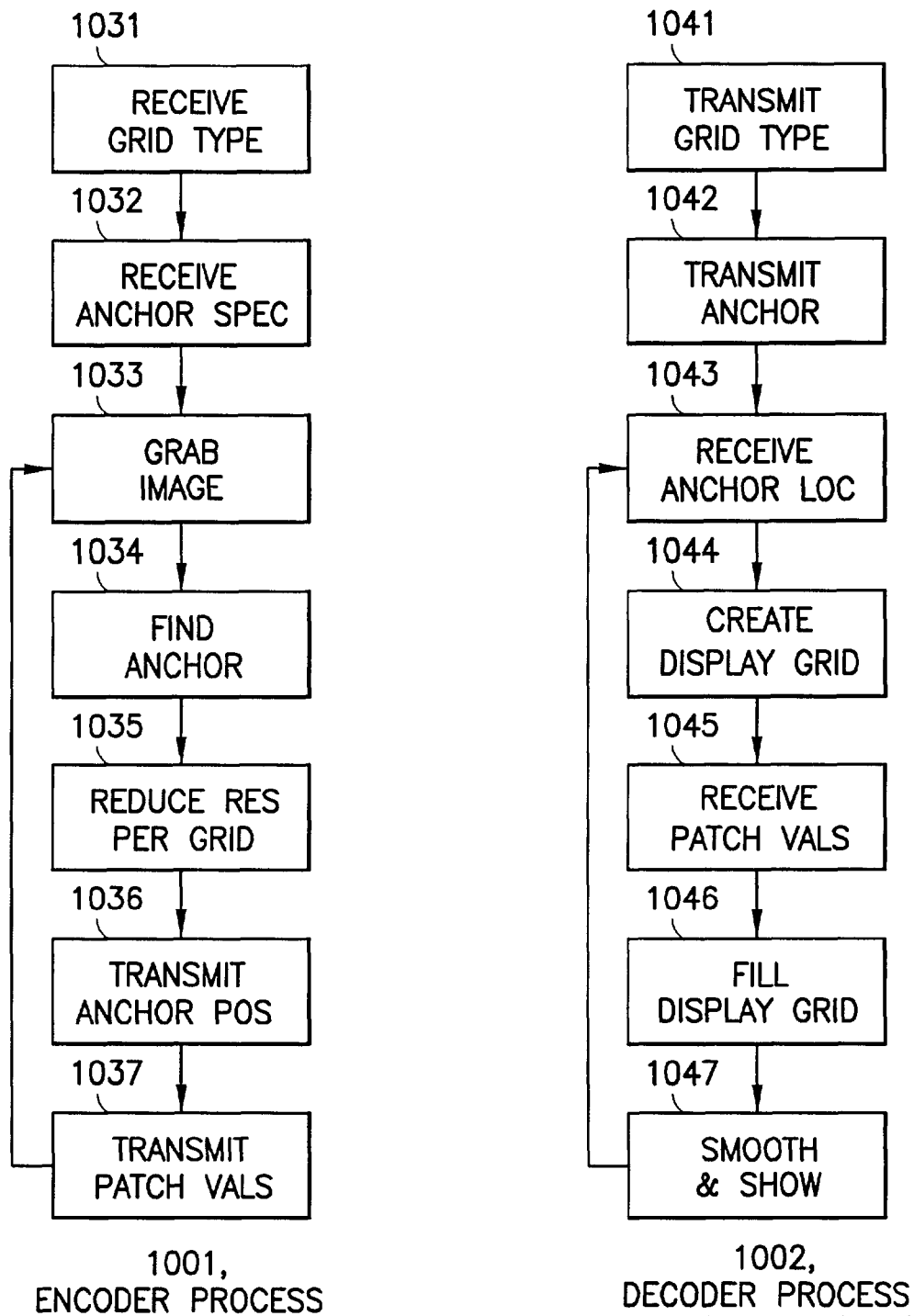
FIG. 10A is a flow chart for a video codec based on variable spatial resolution.

FIG. 10A shows a flow chart for the codec itself. The compressor process 1001 starts by receiving a specification 1031 from the user of what type of spatial variation is appropriate. It then optionally receives some specification 1032 of the anchor feature used to align the resampling grid. The encoder then obtains an image 1033, optionally finds 1034 the anchor feature for aligning the overlaid grid, then reduces the image resolution according to the grid 1035. It transmits the location 1036 (and possibly orientation) of the found anchor feature (if any) to the receiver, then transmits the data used to fill the grid 1037 (the patch values). At this point the loop repeats and another image is acquired 1033.

The decoder process 1002 first specifies the type of grid to use 1041. This might be a linear horizon-type grid as shown in FIG. 10, or some other pattern such as a tunnel-like radial grid. Next it optionally transmits some characterization 1042 of the anchor feature used for aligning the resampling grid. This might be an image patch for correlation, a geometric specification like converging lines near a certain image position, or a standard convention like variation relative to the detected horizon. At this point the decoder waits to receive, first, the detected location of the reference anchor feature 1043. At this point it can generate a grid 1044 in the correct location and orientation for reconstruction. Then it awaits the image patch values 1045 for filling in the resampled image. In step 1046 it uses these values to fill in the grid generated in step 1044. Finally, in step 1047 it optionally smooths the reconstruction to eliminate annoying block boundaries, then displays the result to the office agent. After this it loops and awaits the next grid realignment packet 1043 from the compressor.

Figure 11:
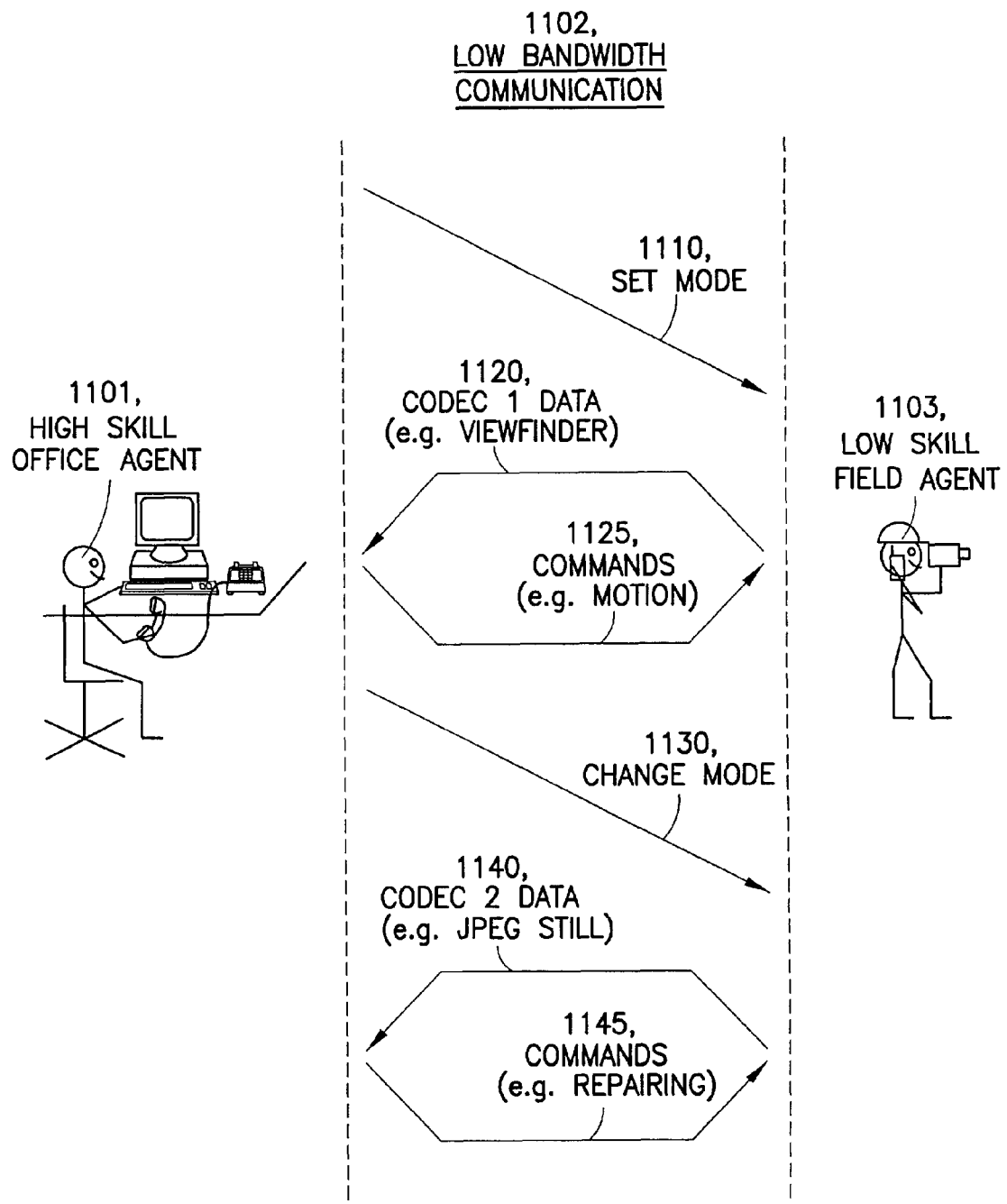
FIG. 11 is an interaction diagram for a business process using switchable semantic codecs.

FIG. 11 depicts a business process using switchable semantic codecs. In the process a highly skilled employee in an office location 1101 wishes to obtain information from a lower skilled field agent 1103, or instruct him in performing some procedure such as a diagnostic or repair. The two agents are restricted to communicate over a low bandwidth link 1102 which is incapable of conveying full-frame rate video information. The office agent first specifies 1110 which codec the field agent should use. The field agent's imaging device then sends back semi-pictoral data 1120 ("codec 1 data") using this compressor. In response, the office agent delivers commands 1125 to the field agent based on this information. Typically the initial codec selected will be some sort of semantic viewfinder to help the office agent 1101 determine where the field agent 1103 has pointed the camera. The commands he issues, perhaps over a separate audio link, are typically instructions for aiming the camera in some other direction or at some other place so that the camera ends up looking at the relevant part of the remote environment. Steps 1120 and 1125 usual cycle for quite a while until this camera positioning is satisfactory.

At some point during the interaction office agent 1101 specifies a new codec 1130 ("change mode") for field agent 1103 to use. Again, there may be a cycle during which the office agent repeatedly receives semi-pictoral data from this new codec 1140 and issues additional instructions 1145 to the field agent. Typically, the second codec selected in step 1130 will be some still-frame compressor (such as JPEG) which will return a high-resolution image of the scene. However, it may take a number of seconds or even minutes for this single frame to be transmitted. The information that flows back 1145 to the field agent is then typically some recommendation for how to repair the object imaged, or some diagnosis about why the object is malfunctioning. In the course of this repair or diagnosis it may be desirable to switch to yet a different codec, or perhaps back to an earlier codec such as the viewfinder.

Having thus described our invention, what we claim as new and desire to secure by Letters Patent is as follows:

1. A business method for providing advice to a remote location, the method comprising the steps of:
    inputting one or more video streams at a field location for transmission of image data, obtained from a sensor, to an office location, the image data including a pictorial representation of at least one object in an image viewed by the sensor;
    selecting, at an office location, a selected compression process out of a set of different compression processes for compressing video of said one or more video streams, the selecting being based on a task, each of said different compression processes serving to modify a video representation of said at least one object by implementation of a symbolic representation of the object, wherein the symbolic representation of the object has less data points to be transmitted than the number of data points in the pictorial representation of the object,
    compressing one or more of the video streams at the field location using the selected compression process to obtain a compressed video;
    transmitting the compressed video from the field location to the office location, wherein the office location uses the compressed video to provide advice to the field location for performing the task;
    transmitting, to the field location, an identification of at least one object related to the task;
    automatically detecting and tracking said at least one object based on attributes of the object, wherein during said tracking, said selecting step is repeated for use of different compression processes to enable transmission of images of reduced detail among images of higher resolution in said transmitting of the compressed video;
    transmitting attributes of said at least one object to the office location; and
    controlling manipulation of the object by a field agent at the field location to accomplish the task, wherein the controlling is accomplished remotely with the aid of communication from the office location to the field location;
    wherein, in said selecting of the compression process, a viewer of images received at the office location from the field location adjusts the compressions of images from said sensor to be transmitted in said transmitting of the compressed video to provide for reduced compression wherein a relatively high resolution image is required and to provide for increased compression wherein a relatively low resolution image is acceptable, thereby enabling said transmitting of the compressed video to provide more high resolution imaging over a communication link of reduced bandwidth.

2. A business method, as in claim 1, further comprising the steps of:
    sending advice from the office location to the field location after viewing the compressed video at the office location; and wherein, in the step of compressing one or more of the video streams, the compression provides for a semantic compression of the one or more of the video streams for reducing data of an image to be transmitted in the step of transmitting the compressed video from the field location to the office location.

3. A business method, as in claim 1, where the office location causes the field location to change the selected compression process one or more times during the task.

4. A business method, as in claim 1, where the set of compression processes provides semantic compression processes, and the set includes one or more of the following compression processes: selective edge retention, line finding, motion segmentation, patch tracking, template matching, object tracking, spatially varying resolution, MPEG-1, MPEG-2, MPEG-4, M-JPEG, M-JBIG, H.261, H.323, and region segmentation.

5. A business method, as in claim 1, where a user in the office location has greater expertise in the task than a user in the field location.

6. A business method, as in claim 1, where the task includes any one or more of the following: diagnostics with an expert at a remote site, an observation, a scene inspection, a scene surveillance, a navigation, an objection localization, a control, a maintenance procedure, and a diagnostic procedure.

7. A business method, as in claim 1, where a user in the office location can not personally access the field location during the performance of the task.

8. A business method, as in claim 7, where the user in the office location can not personally access the field location for one or more of the following reasons: a weather condition, a hazard, a geographic inaccessibility, a time constraint, a political barrier, a personal constraint, a physical constraint, a medical constraint, and an economic constraint.

9. The business method of claim 1 further comprising the selected compression process having a compression ratio greater than 100:1.

10. The business method of claim 1 wherein the set of compression processes comprises at least one of selective edge retention, line finding, motion segmentation, patch tracking, template matching, object tracking, spatially varying resolution and region segmentation.

11. The business method of claim 1 wherein using the selected compression process to obtain a compressed video further comprises representing only parts of a scene at the field location.

12. The business method of claim 1 further comprising the selected compression process transmitting only a portion of a scene information that is relevant to the task.

13. The business method of claim 1 further comprising selecting another compression process out of the set of compression processes that will return a higher resolution image of a selected portion of a scene at the field location from the compressed video and using the another compression process to obtain a second compressed video with the higher resolution image of the scene.

14. A method of using task-based compression in teleoperations comprising:
    selecting, from an office site, at least one compression process from a set of different compression processes operative for compression of video to be transmitted in a video stream, the selected compression process being adapted to transmit only that portion of a scene information from a field site that is relevant to a particular task, the scene information including a pictorial representation of at least one object in a scene at the field site, each of said different compression processes serving to modify a video representation of the at least one object by implementation of a symbolic representation of the object, wherein the symbolic representation of the object has less data points to be transmitted than the number of data points in the pictorial representation of the object;

compressing a signal comprising scene information obtained from a sensor by using the at least one selected compression process at the field site;

transmitting the compressed signal to the office site;

decompressing the compressed signal at the office site;

identifying at least one object to be tracked;

detecting said at least one object;

tracking said at least one object, wherein during said tracking, said selecting is repeated for use of different compression processes to enable transmission of images of reduced detail among images of higher resolution in said transmitting of the compressed signal;

transmitting detection attributes of said at least one tracked object to the office site; and controlling manipulation of said at least one object by a field agent at the field site to accomplish the task, wherein the controlling is accomplished remotely with the aid of communication from the office site to the field site;

wherein, in said selecting of the compression process, a viewer of images received at the office site from the field site adjusts the compressions of images from said sensor to be transmitted in said transmitting of the compressed signal to provide for reduced compression wherein a relatively high resolution image is required and to provide for increased compression wherein a relatively low resolution image is acceptable, thereby enabling said transmitting of the compressed signal to provide more high resolution imaging over a communication link of reduced bandwidth.

15. The method of claim 14 further comprising:

displaying the decompressed signal at the office site;

selecting another portion of the scene from the displayed decompressed signal that is desired to be viewed;

selecting, at the office site, at least one other compression process that will return a higher resolution image of the another portion of the scene desired to be viewed;

transmitting the at least one other compression process to the field sight;

acquiring, at the field site, another signal of the portion of the scene desired to be viewed;

compressing the another signal using the at least one other selected compression process;

transmitting the another compressed signal to the office site; and decompressing the another compressed signal at the office site.

16. The method of claim 14 further comprising selecting two or more compression processes from the set of compression process to be used to acquire and compress the signal with the scene information from the field site, and displaying different compressed signals at the office site on at least one output device.

17. The method of claim 14 wherein the set of compression processes includes semantic compression processes, and the set comprises at least one of selective edge retention, line finding, motion segmentation, patch tracking, template matching, object tracking, spatially varying resolution and region segmentation.

18. The method of claim 14 further comprising the selected compression process having a compression ratio greater than 100:1.

19. The method of claim 14 wherein using the at least one selected compression process to compress the signal further comprises representing only parts of a scene at the field location in the compressed signal.

20. The method of claim 1 further comprising transmitting tracking information of the at least one object.

21. The method of claim 1 further comprising specifying a class of objects for which a detection system is available.

22. The method of claim 21 wherein the class of objects is flesh tone.

23. The business method of claim 1, wherein the set of compression processes includes a compression process providing a compression of the at least one object in the image without a compression of all objects in the image.

24. The business method of claim 1, wherein the set of compression processes includes a compression process providing a deletion of a portion of the image without a deletion of another portion of the image.

25. The business method of claim 1, wherein the set of compression processes includes a compression process providing a depiction of an edge with deletion of texture of a high-textured region of the at least one object in the image.

26. The business method of claim 1, wherein the set of compression processes includes a compression process providing a representation of a boundary with deletion of other aspects of the at least one object in the image.

27. The method of claim 14, wherein the set of compression processes includes a compression process providing a compression of the at least one object in an image of the scene at the field site without a compression of all objects in said image.

28. The method of claim 14, wherein the set of compression processes includes a compression process providing a deletion of a portion of an image of the scene at the field site without a deletion of another portion of said image.

29. The method of claim 14, wherein the set of compression processes includes a compression process providing a depiction of an edge with deletion of a high-textured region of the at least one object in an image of the scene at the field site.

30. The method of claim 14, wherein the set of compression processes includes a compression process providing a representation of a boundary with deletion of other aspects of the at least one object in an image of the scene at the field site.

31. The business method of claim 1, wherein the set of compression processes includes a compression process providing a sampling grid with varying pixel sizes for viewing the at least one object in the image, the viewing via the sampling grid providing for a relatively high resolution at said object and for a relatively low resolution in a region of the image distant from said object.

32. The method of claim 14, wherein the set of compression processes includes a compression process providing a sampling grid with varying pixel sizes for viewing the at least one object in an image of the scene at the field site, the viewing via the sampling grid providing for a relatively high resolution at said object and for a relatively low resolution in a region of the image distant from said object.

* * * * *